US011644960B1

(12) United States Patent
Singh

(10) Patent No.: US 11,644,960 B1
(45) Date of Patent: May 9, 2023

(54) IMAGE DATA AUGMENTATION USING USER INTERFACE ELEMENT ATTRIBUTES

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/532,534

(22) Filed: Nov. 22, 2021

(51) Int. Cl.
| | | |
|---|---|---|
| G06F 3/0484 | (2022.01) | |
| G06F 3/04845 | (2022.01) | |
| G06F 3/04842 | (2022.01) | |
| G06V 10/774 | (2022.01) | |
| G06N 20/00 | (2019.01) | |
| G06V 10/94 | (2022.01) | |
| G06V 10/776 | (2022.01) | |
| G06F 40/143 | (2020.01) | |

(52) U.S. Cl.
CPC ...... *G06F 3/04845* (2013.01); *G06F 3/04842* (2013.01); *G06N 20/00* (2019.01); *G06V 10/774* (2022.01); *G06V 10/945* (2022.01); *G06F 40/143* (2020.01); *G06V 10/776* (2022.01)

(58) Field of Classification Search
CPC .. G06F 3/04812; G06F 40/103; G06F 40/279; G06F 40/295; G06F 40/109; G06F 3/04817; G06F 3/0484; G06F 3/0482; G06F 16/345; G06F 40/205; G06F 40/284; G06F 3/04815; G06F 3/04845; G06F 3/04842; G06F 40/143; G06T 11/00; G06T 19/006; G09G 5/34; G09G 2370/027; G06V 10/774; G06V 10/945; G06V 10/776; G06N 20/00
See application file for complete search history.

(56) References Cited

U.S. PATENT DOCUMENTS

| | | | | |
|---|---|---|---|---|
| 7,536,650 | B1 * | 5/2009 | Robertson | G06F 3/0481 715/767 |
| 8,225,224 | B1 * | 7/2012 | Robertson | G06F 3/04845 715/767 |
| 9,285,502 | B2 * | 3/2016 | Perlmutter | G01V 11/00 |
| 9,478,054 | B1 * | 10/2016 | Lewis | G09G 5/02 |
| 11,334,762 | B1 * | 5/2022 | Wrenninge | G06K 9/6256 |
| 2005/0157948 | A1 * | 7/2005 | Lee | H04N 21/4316 382/254 |

(Continued)

FOREIGN PATENT DOCUMENTS

| | | | | |
|---|---|---|---|---|
| AU | 2007325117 A1 * | 7/2009 | | G06F 16/583 |
| CN | 107808129 A * | 3/2018 | | G06K 9/00281 |

(Continued)

*Primary Examiner* — Steven P Sax

(57) ABSTRACT

A computer system configured to augment images of software objects is provided. The computer system includes a memory and at least one processor coupled to the memory. The at least one processor is configured to iteratively select an attribute value from a predetermined set of attribute values; modify an attribute of a software object according to the attribute value; and generate a respective augmented image of the software object with the attribute modified according to the attribute value. The software object may comprise an executable software object.

19 Claims, 19 Drawing Sheets

(56) References Cited

U.S. PATENT DOCUMENTS

| | | | |
|---|---|---|---|
| 2005/0246653 A1* | 11/2005 | Gibson | G06F 16/957 |
| | | | 707/E17.119 |
| 2014/0095982 A1* | 4/2014 | Pearson | G06F 40/154 |
| | | | 715/235 |
| 2015/0186418 A1* | 7/2015 | Harp | G06F 16/5854 |
| | | | 707/723 |
| 2015/0242008 A1* | 8/2015 | Beckman | G06F 3/016 |
| | | | 345/177 |
| 2015/0346969 A1* | 12/2015 | Strabbing | G06F 3/04845 |
| | | | 715/723 |
| 2017/0131874 A1* | 5/2017 | Redenbach | G06F 3/04815 |
| 2017/0277663 A1* | 9/2017 | Reimherr | G06F 3/0481 |
| 2020/0372205 A1* | 11/2020 | Bradley | G06F 16/9577 |
| 2022/0011929 A1* | 1/2022 | Han | H04N 21/4728 |
| 2022/0092100 A1* | 3/2022 | Gaskill | G06F 40/103 |

FOREIGN PATENT DOCUMENTS

| | | | | |
|---|---|---|---|---|
| WO | WO-2019143572 A1 | * | 7/2019 | |
| WO | WO-2021021624 A1 | * | 2/2021 | G06K 9/00476 |

* cited by examiner

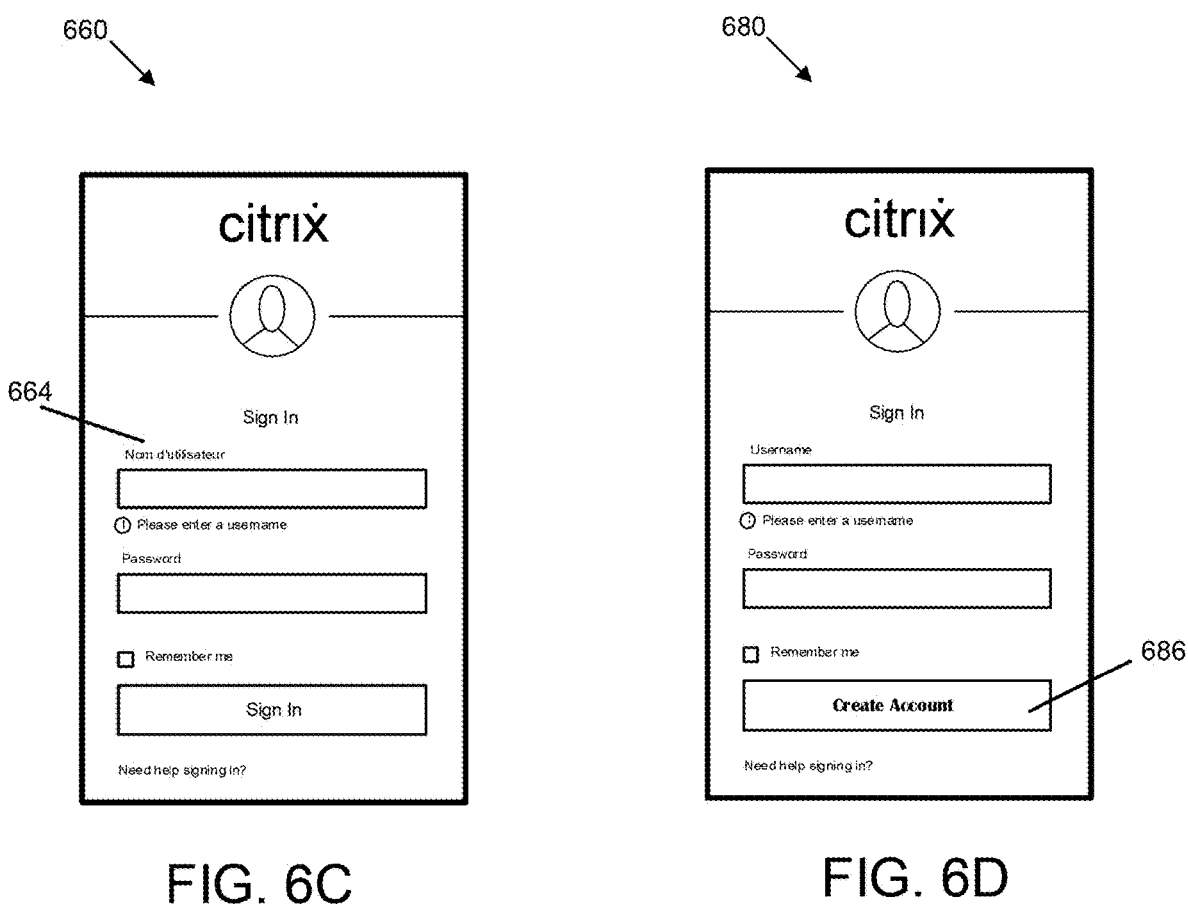

IMAGE DATA AUGMENTATION USING USER INTERFACE ELEMENT ATTRIBUTES

BACKGROUND

Computer vision (CV) machine learning (ML) models are useful for problems such as image classification, object detection, segmentation, and the like. For example, CV ML models may be based on TensorFlow models or neural networks including Convolutional Neural Networks, etc.

SUMMARY

In at least one example, a client computer system configured to augment images of software objects is provided. The client computer system includes a memory and at least one processor coupled to the memory. The at least one processor is configured to iteratively select an attribute value from a predetermined set of attribute values, modify an attribute of a software object according to the attribute value, and generate a respective augmented image of the software object with the attribute modified according to the attribute value.

At least some examples of the client computer system can include one or more of the following features. In the system, to modify the attribute of the software object can include to receive a user selection of one or more user interface (UI) elements belonging to the software object and the attribute. The attribute can characterize the one or more UI elements. To modify the attribute of the software object can further include to receive a user specification of the predetermined set of attribute values. To modify the attribute of the software object can further include to modify the attribute characterizing the one or more UI elements according to the attribute value.

In the system, the software object can include an executable software object.

In the system, to generate the respective augmented image can include to receive a user selection of a portion of a display view, and to generate the respective augmented image of the software object according to the user selection of the portion of the display view.

In the system, to modify the attribute of the software object can be based on one or more of: a UI automation application programming interface (API); hooking; a modified hypertext markup language (HTML) document; a modified document object model (DOM); a modified cascading style sheet (CSS) attribute; or a data augmentation toolbox.

In the system, to modify the attribute of the software object can include to modify an HTML document corresponding to the software object via a headless browser session.

In the system, the attribute of the software object can include one or more of: a window size or aspect ratio; text contents; a text size or color; a font style; a theme; an icon; a window title size or color; or a button appearance or button text.

In the system, the attribute can be a first attribute and the attribute value can be a first attribute value. The at least one processor can be further configured to iteratively select a second attribute value from a second predetermined set of attribute values, and modify a second attribute of the software object according to the second attribute value. To generate the respective augmented image can include to generate the respective augmented image with the first attribute modified according to the first attribute value and the second attribute modified according to the second attribute value.

In the system, the software object can include one or more of: an executable application, a window, a dialog box, another UI element, a web page, a web app, or a software as a service (SaaS) app.

In the system, the attribute of the software object can comprise a foreground position of the software object. To modify the attribute of the software object can comprise to overlay the software object at the foreground position over a background object, while a position of the background object remains unmodified.

In the system, to overlay the software object at the foreground position over the background object can comprise to overlay a foreground image of the software object at the foreground position over a background image of the background object.

In at least one example, a method of augmenting images of software objects is provided. The method includes acts of iteratively selecting an attribute value from a predetermined set of attribute values, modifying an attribute of a software object according to the attribute value, and generating a respective augmented image of the software object with the attribute modified according to the attribute value.

At least some examples of the method can include one or more of the following features. The method can further include acts of training, testing, or validating a machine learning process based on the generated augmented image.

At least some examples are directed to a non-transitory computer readable medium storing executable instructions to augment images of software objects. In these examples, the instructions can be encoded to execute any of the acts of the method of recognizing and responding to UI elements described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented

FIG. 6C illustrates an example login web page with augmented text, in accordance with an example of the present disclosure.

FIG. 6D illustrates an example login web page with an augmented button, in accordance with an example of the present disclosure.

DETAILED DESCRIPTION

As summarized above, various examples described herein are directed to systems and methods to augment images of software objects (also referred to as an application interface object), such as a window, dialog box or other user interface object, locally executed applications, web applications, software as a service (SaaS) applications, and the like. These augmented images can be used for training, testing, and validation datasets for computer vision (CV) machine learning (ML) models (e.g., based on TensorFlow models, neural networks such as Convolutional Neural networks, etc.) for image classification, object detection, segmentation, and the like.

Figure 1:
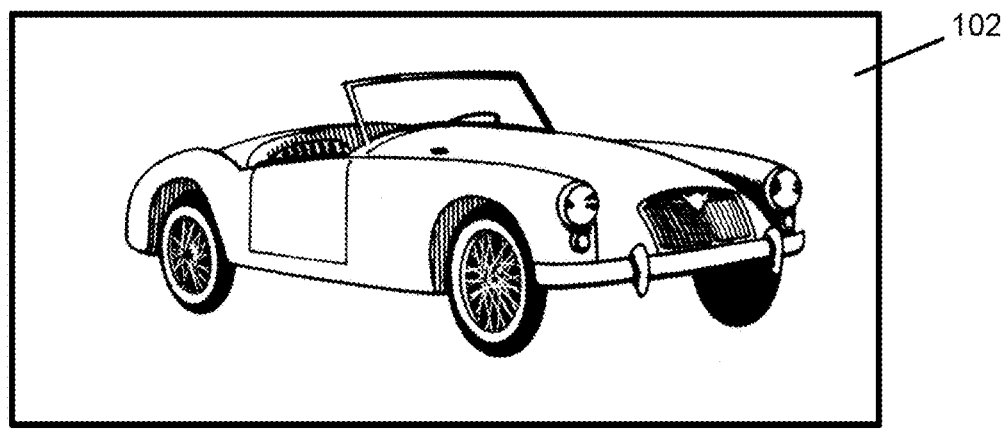
FIG. 1 illustrates an example of image augmentation used to generate a training, testing, or validation dataset for CV ML.
Figure 1:
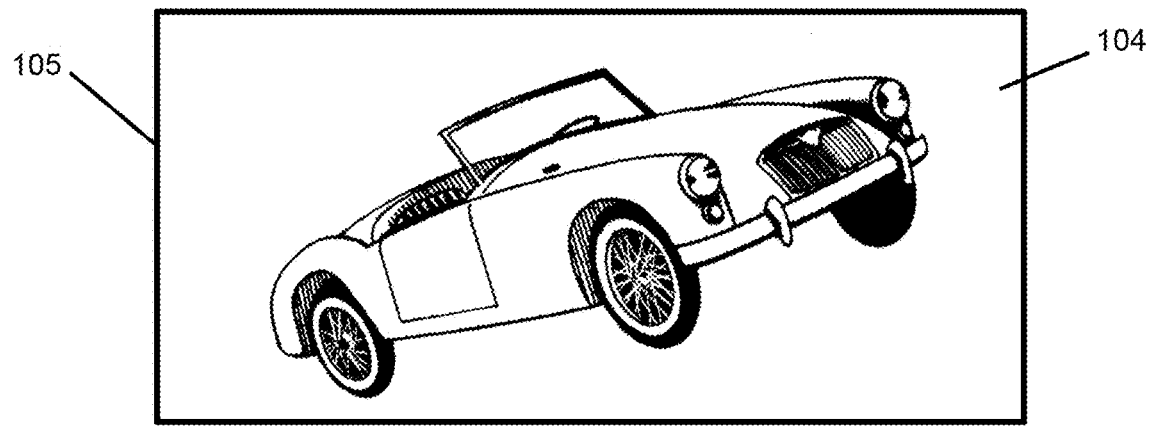
Figure 1:
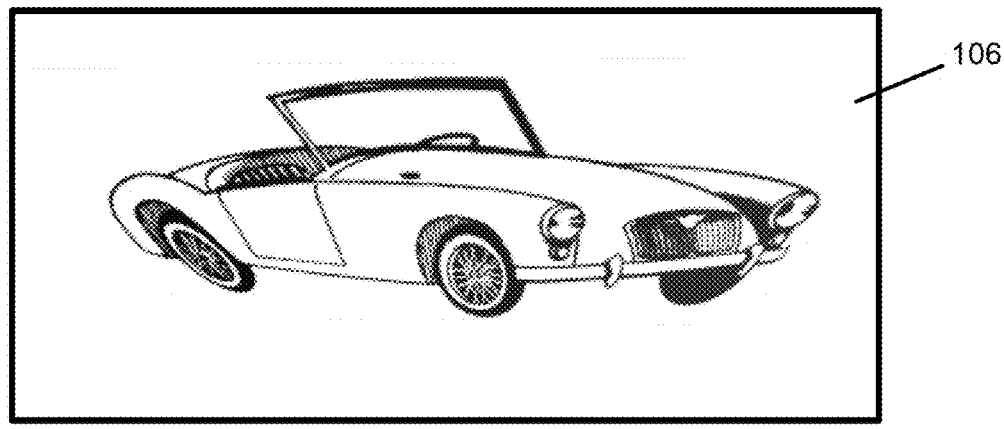

FIG. 1 illustrates an example of image augmentation used to generate a training, testing, or validation dataset for CV ML. In this example, a CV ML model is being trained, tested, and/or validated to recognize images of cars. A user, such as an IT administrator or a data scientist, wishes to use original image 102 of a car to train, test, and/or validate the model. Image 102 may have been acquired from any source, for example, a digital camera, clip art, a manipulated image, and the like. In addition, the user may possess additional images of cars, thereby forming a sizable dataset of images for training, testing, and/or validation.

However, a CV ML model may require a very large dataset of images to train the model effectively. Training with sufficiently large datasets can improve the performance of the model by improving generalization, thereby reducing overfitting. Likewise, testing and validation also require large image datasets. These image datasets may be generated by augmenting existing images to produce additional images that differ from the original ones, but continue to provide realistic example images for training, testing, and validation. Accordingly, the user may augment original image 102 to produce additional images, such as images 104 and 106, that differ from original image 102, thereby generating a considerably larger image dataset.

In this example, image 104 may be produced from image 102 by rotation. In particular, image 104 may be a version of image 102 rotated about a point in the image, for example rotated by 35° about the image's center. In some examples, many variations of the rotated image 104 are possible, for example by choosing different points for the rotation, as well as different rotational angles. Accordingly, the user may generate ten or even 100 rotated images 104 in the augmented dataset from each image 102 in the original dataset. Note also that in this example, the border 105 of the rotated image 104 has the same shape and orientation as the border of original image 102. Alternatively, the border of rotated image 104 may differ from the original border, for example by being rotated together with image 104.

Likewise, image 106 may be produced from image 102 by shearing, skewing, or distorting. In particular, image 106 may be a version of image 102 sheared or skewed so that angles within the image are modified. For example, shearing can shift or transform a part of the image from having a rectangular outline to instead have a parallelogram outline. In some examples, many variations of the sheared, skewed, or distorted image 106 are possible, for example by choosing different degrees of shear or skewing and/or different types of distortion. Accordingly, the user may generate hundreds or even thousands of sheared, skewed, or distorted images 106 in the augmented dataset from each image 102 in the original dataset.

In addition, many other image transformations are possible to augment the dataset. For example, the image 102 can be reflected or inverted vertically or horizontally, cropped, zoomed or scaled in or out, and/or modified in image qualities such as brightness, contrast, hue, saturation, and sharpness. In addition, these transformations can be performed in multiple ways and to varying degrees, and be performed separately or in any combination, thereby enabling the user to generate many thousands of augmented images from each original image 102, resulting in a very large augmented dataset.

However, while these techniques may be useful for augmenting ordinary images of physical objects to generate a large dataset, they may not be as applicable to training CV ML to recognize software objects. In particular, for many applications, it may be useful to recognize software objects such as windows, dialogs, controls, web pages, web apps, SaaS apps, and the like. For example, recognizing software objects can be useful for error remediation, troubleshooting, security, productivity, authorization, and/or privacy applications. However, when applied to software objects, certain image augmentation techniques, especially techniques that only augment a static image like those in the examples above, may do little to improve the predictiveness or generalizability of CV ML models.

Figure 2A:
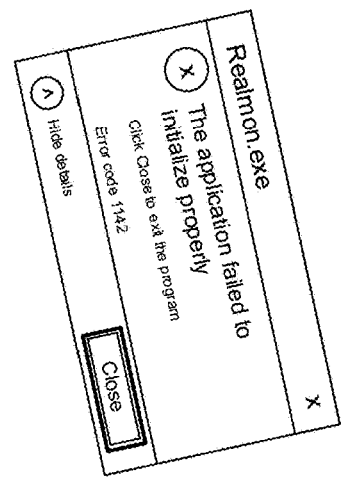
FIG. 2A illustrates an example image of a software object augmented by rotation.

FIG. 2A illustrates an example image 200 of a software object augmented by rotation. In this example, an image 200 of a dialog box has been rotated, similar to the way image 104 is a rotated version of image 102 in the example of FIG. 1. However, in practice, a real dialog would virtually never appear rotated like image 200 on a client computer's display. Even if the user were to use a client mobile device, such as a mobile phone, which could display a rotated dialog, the user would be unlikely to use the rotated dialog for any appreciable length of time, nor would the user be likely to use it at an angle such as the one shown. Accordingly, augmented image 200 may be inapplicable for training a CV ML model to recognize a software dialog, window, web page, or SaaS app, since the CV ML model would be unlikely to encounter a rotated dialog in practical usage.

Figure 2B:
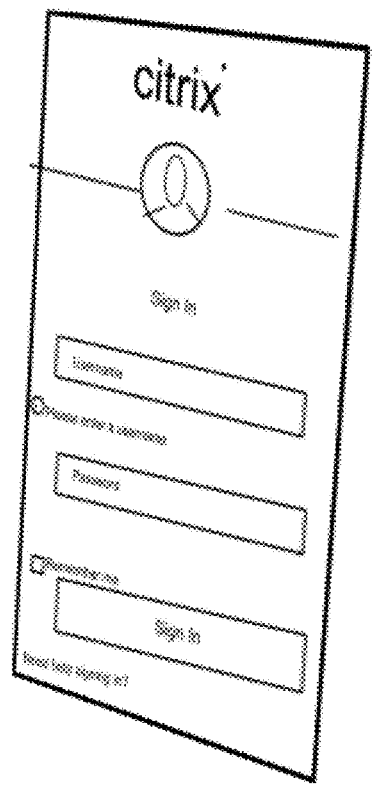
FIG. 2B illustrates an example image of a software object augmented by skewing, shearing, or distortion.

FIG. 2B illustrates an example image of a software object augmented by skewing, shearing, or distortion. In this example, an image 250 of a login web page has been skewed, sheared, or distorted, similar to the way image 106 is a skewed, sheared, or distorted version of image 102 in the example of FIG. 1. However, in practice, a real web page would virtually never appear like image 250 on a client device's display. Accordingly, augmented image 250 may be inapplicable for training a CV ML model to recognize a software dialog, window, web page, or SaaS app, since the CV ML model would be unlikely to encounter such a skewed, sheared, or distorted web page in practical usage.

In the case of augmenting by modifying image qualities (e.g., brightness, contrast, hue, saturation, sharpness, and the like), this augmentation may improve the dataset marginally, but still leaves many other attributes of the software object images unmodified, for example label text, button text, color, icons, and the like.

Moreover, note that simply expanding the size of a training set with poor quality or irrelevant samples may not serve to improve the resulting model's predictiveness. For example, training the CV ML model with a poor training dataset might fail to enhance the model's predictiveness if the training data were largely uncorrelated with the actual data to be predicted. In another example, a poor training dataset could even harm the model's predictiveness if the training data were anticorrelated with the actual data. In yet another example, if the training data were too repetitive, the model could be overfit to known data while failing to predict new results correctly.

The augmented software images shown in the examples of FIGS. 2A and 2B may be poorly correlated or even uncorrelated with actual software objects to be detected, since the example images 200 and 250 are dissimilar from software objects in practical usage. Thus, there is a need for an expeditious solution to augmenting training, testing, and validation datasets with large numbers of relevant, realistic software object images. The disclosed system and methods can address this need by augmenting large numbers of attributes of software objects, and generating augmented images thereof.

The software object image augmentation systems and processes described herein can be implemented within a variety of computing resources. For instance, in some examples, the software object image augmentation systems and processes are implemented within a browser and/or a browser extension. Moreover, in some examples, the systems and processes are implemented within a virtualization infrastructure, such as the HDX™ virtualization infrastructure commercially available from Citrix Systems of Fort Lauderdale, Fla., in the United States. In these examples, the software object image augmentation systems and processes can be implemented within a workspace client app (also referred to as a digital workspace application), such as the Citrix Workspace™ application; a browser embedded within the workspace client app; a secure browser service, such as the Citrix Secure Browser™ service; a gateway appliance, such as the Citrix Application Delivery Controller™ (ADC); a virtualization agent, and/or other computing resources.

Selecting Software Objects for Augmentation

Figure 3A:
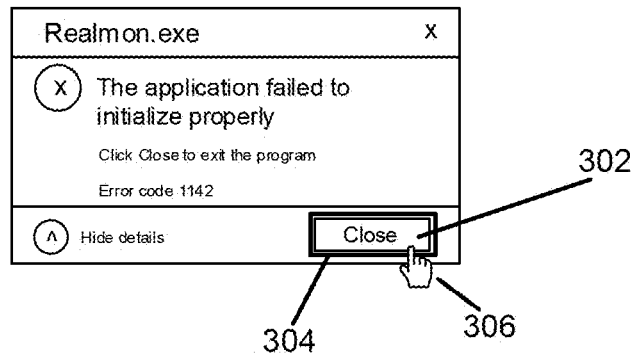
FIG. 3A illustrates selecting a button of a dialog for augmentation, in accordance with an example of the present disclosure.

FIG. 3A illustrates selecting a button 302 of a dialog 300 for augmentation, in accordance with an example of the present disclosure. A user, such as an administrator or data scientist, can initiate a data augmentation tool implementing the disclosed system and methods, such as data augmentation tool 1502 in the example of FIG. 15 below. In various examples, the data augmentation tool can include several components, be a standalone application, or be embedded within a workspace client app in a virtualization infrastructure, a browser, or another application. For example, in the case that dialog 300 is displayed by a locally executed application, the tool may be triggered from a workspace client app, or may execute as a standalone toolbox, like data augmentation toolbox 1504 in the example of FIG. 15. If dialog 300 is displayed by a web or SaaS app, such as in the example of FIG. 4 below, the tool can be a browser extension, or may be provided as part of the browser, for example for an embedded browser (e.g., chromium-based browser).

From the data augmentation tool, the user can select an option to select a UI or HTML element by hovering over it. In an example, the system may disable user click events within dialog 300, so that the user can click to select a UI or HTML element for data augmentation, without the click causing an interaction with the UI elements of dialog 300. The user can then hover the cursor 306 controlled by a pointing device (e.g., mouse) over the dialog 300. In this example, cursor 306 changes to a pointing hand icon in order to indicate user selection of a UI element. In an example, the cursor 306 and/or the bounding box 304 may be displayed directly by the data augmentation tool. Alternatively or additionally, the system can use UI automation, hooking, and/or another method, to change cursor 306, as well as to show the selected UI element with a bounding box 304, indicating that it is being hovered over (e.g., based on a mouseover event). In this example, the cursor 306 hovers over the button 302, and the system can cause the button to be displayed with bounding box 304 surrounding it.

Figure 3B:
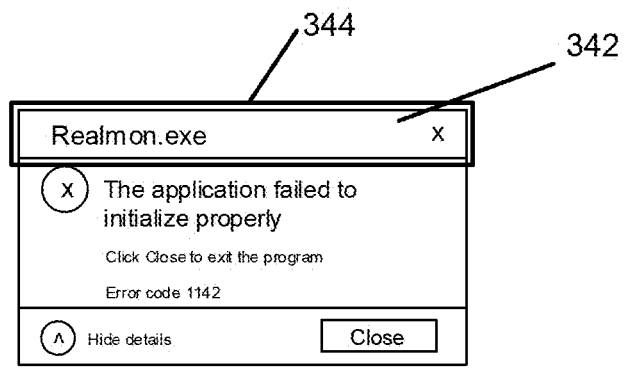
FIG. 3B illustrates selecting a title bar of a dialog for augmentation, in accordance with an example of the present disclosure.

FIG. 3B illustrates selecting a title bar 342 of a dialog 300 for augmentation, in accordance with an example of the present disclosure. In an example, the user may have the option to unselect a selected UI element, such as the button 302 of the example of FIG. 3A (for example, by selecting again to toggle the selection). The user can then select a new UI element, such as selected title bar 342 in this example.

As shown, the system can then display bounding box 344 around title bar 342 to indicate the user selection. For example, the system may use UI automation, hooking, modified HTML, a modified DOM, modified CSS attributes, and/or another method to display bounding box 344.

Once a UI element, such as title bar 342, is selected, the system can then provide the user with an opportunity to select attributes and attribute values for data augmentation, for example from a menu of options. For example, the tool can show a menu with various attributes of the selected title bar 342. The user can select an attribute and specify a list of values to iterate over. The user can repeat these steps, selecting multiple UI elements and attributes to augment. Finally, the user can select a display view for image augmentation.

Note that in some examples, rather than obtaining the list of attribute values exclusively from user input, the system can generate some or all of the list of attribute values. Accordingly, by generating attribute values with less user interaction, the system may generate a large number of augmented software object images more expeditiously and efficiently. For example, the system can randomly generate attribute values, for example by using a pseudorandom number generator to directly generate numerical attribute values, or as an index to a dictionary of non-numerical values. In another example, the system may include all possible attribute values in the list. For example, if the attribute is a color, the system may iterate through all available color values when generating augmented software objects. If the attribute is a size, location, or aspect ratio, the system may iterate through all pixel values. In yet another example, the system can make use of natural language generation technology to generate values for text attributes, such as labels or captions. For example, the system may use words generated from random letter choices, sentences generated from random words, and/or sentences generated with a data-to-text summarization system based on random data. In another example, the system may use words and/or sentences generated with a language translation system to translate from one language to another.

Figure 3C:
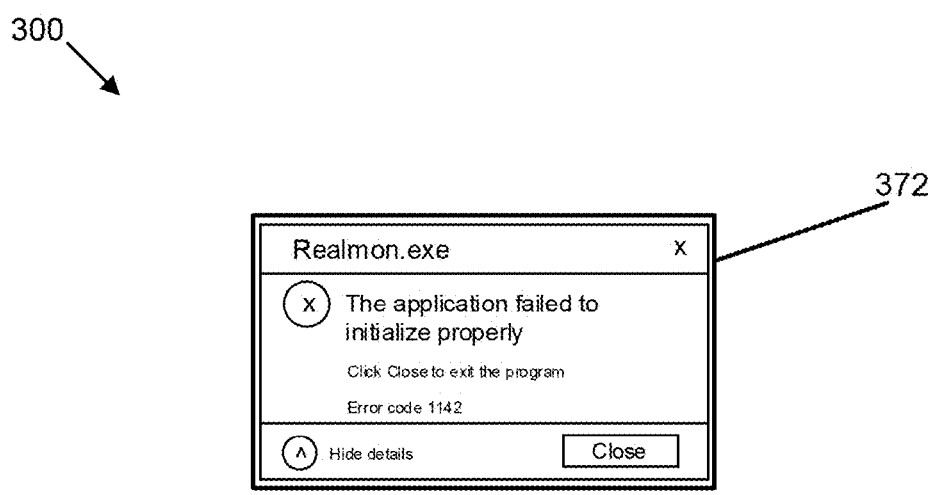
FIG. 3C illustrates selecting a display view of a dialog for image augmentation, in accordance with an example of the present disclosure.

FIG. 3C illustrates selecting a display view of a dialog 300 for image augmentation, in accordance with an example of the present disclosure. The user can select the outer region or bounding box 372 with which the image should be generated. In some examples, the user selects the bounding box 372, for example by dragging a mouse cursor over the bounding box. In other examples, the system can recognize the outlines of dialog 300, for example by using UI automation or hook messages via the operating system to determine coordinates and dimensions of dialog 300, and can automatically select bounding box 372 when the user hovers the mouse cursor over dialog 300 (e.g., in response to a mouseover event).

In this example, bounding box 372 surrounds the entire dialog 300. Accordingly, when the system generates augmented images, it can generate images of the entire modified dialog 300. The user can specify a location, such as a directory, where the image files should be generated and any prefixes, suffixes, or sequence numbers to be used in generating the augmented data files. The system can iterate over permutations and/or combinations of the specified attributes and values of the selected UI elements. In addition, the system may modify part or all of a hierarchy of descendant attributes of the specified attributes, such as child attributes, grandchild attributes, and so forth. For example, if the user has selected an entire error dialog, the system may modify any UI elements within the error dialog. For example, the system may modify a color attribute of a "close" button in the dialog in a first augmentation iteration, while in a second iteration, it may modify a circular error icon containing an "X" to a square icon containing the "X."

As disclosed herein, the system can augment the UI elements using UI automation APIs, HTML/DOM, CSS attributes and the like, to generate new images. In each iteration, the system takes an image snapshot of the display region specified by the user, such as bounding box 372, and saves the resulting image file. Alternatively, in some examples, the system can automatically determine the display region for the snapshot, e.g. based on the selection of UI elements and/or attributes for augmentation. For example, if a user selected a button for augmentation, then the system may determine (e.g., based on a hierarchy of UI elements) that the selected button is part of a dialog or a window, and may accordingly determine that the snapshot image should be taken of the entire dialog or window.

Figure 4:
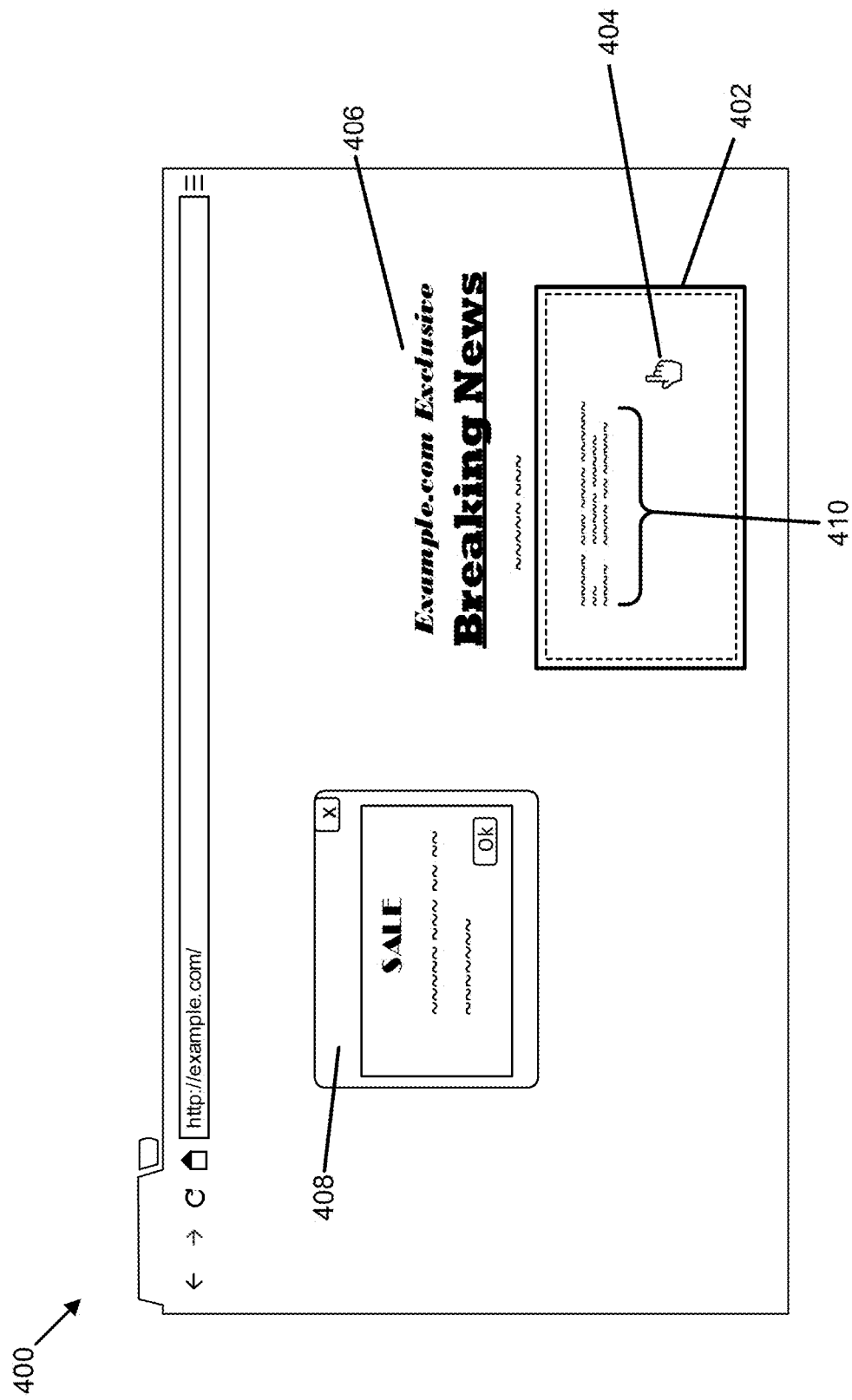
FIG. 4 illustrates selecting an element of a web page for augmentation, in accordance with an example of the present disclosure.

FIG. 4 illustrates selecting an element of a web page 400 for augmentation, in accordance with an example of the present disclosure. In this example, a user, such as an administrator or data scientist, selects UI elements from a news website 400, in this case news article 410. For example, the user can select the UI elements by hovering the mouse cursor 404 over them (e.g., based on a mouseover event).

In this example, the system indicates that news article 410 is selected by a dotted border 402. In an example, the system may display border 402 in a color, such as red, in order to be visually conspicuous. In another example, the system may highlight the selection as a whole with a color, such as yellow. Other UI elements of page 400, such as headline 406 and popup advertisement window 408, are not indicated by border 402 because cursor 404 is not hovering over them. Alternatively, in another example, the system can make the selections persistent, so that a user can simultaneously select multiple UI elements, for example popup window 408 and news article 402.

In order to select the UI elements, such as article 410, for augmentation, a user, such as an administrator or data scientist, may initiate a data augmentation tool. In various examples, this tool may be a browser extension, or be part of a web browser, for example for an embedded browser (e.g., chromium-based browser). From the data augmentation tool, the user can choose an option to select an HTML element, or another web technology element, by hovering over it. In an example, the system may disable any click within the web browser and/or web page 400, so that the user can click to select an HTML element for data augmentation, without interacting with the web page 400.

The user can then hover the mouse cursor 404 over the web page 400. In this example, mouse cursor 404 has changed to a pointing hand icon in order to indicate user selection of a UI element. As shown, the mouse cursor 404 hovers over article 410, and the system can cause the bounding box 402 to surround it. The data augmentation tool may directly display the bounding box 402, indicating the selection, or the system can use HTML, DOM, CSS attributes and/or another method, to change mouse cursor 404, as well as to show the selected UI element with bounding box 402.

Augmenting Software Objects

Figure 5A:
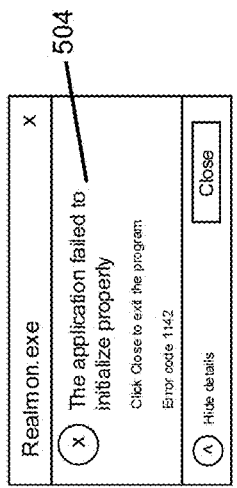
FIG. 5A illustrates an example error dialog, in accordance with an example of the present disclosure.

FIG. 5A illustrates an example error dialog 300, in accordance with an example of the present disclosure. Error dialog 300 may correspond to the example error dialog of FIGS. 3A-3C, which can be selected by a user to specify attributes and attribute values for augmentation, as described above.

As shown, error dialog 300 can have an error message 504 as dialog text. In particular, error message 504 reads, "The application failed to initialize properly. Click Close to exit the program. Error code 1142."

In an example, error message 504 may be the original, unmodified dialog text of error dialog 300. For example, error dialog 300 may be displayed by a locally executed application or by the operating system in response to an error, to inform the user about the error status. In this case, error dialog 300 may display error message 504 as instructed by the original application or operating system instructions, unmodified by the disclosed system and methods. The disclosed system and methods can be used to generate many variations on an existing software object, such as error dialog 300 from a locally executed application, as illustrated in the example of FIG. 5B below.

Figure 5B:
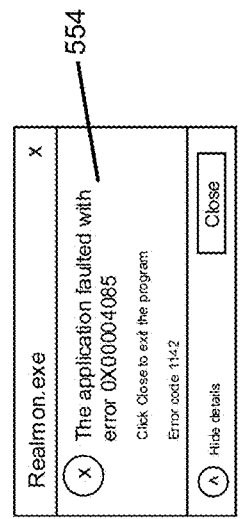
FIG. 5B illustrates an example augmented error dialog, in accordance with an example of the present disclosure.

FIG. 5B illustrates an example augmented error dialog 550, in accordance with an example of the present disclosure. In this example, error dialog 550 may be an augmented version of error dialog 300 of the examples of FIGS. 3A-3C and 5A. For example, a user may select error dialog 300 in the example of FIG. 5A, specify the dialog text as an attribute of error dialog 300 to be augmented, and specify new dialog text to replace error message 504 of FIG. 5A. The user may then use the disclosed system and methods to augment error dialog 300, resulting in augmented error dialog 550.

In particular, error dialog 550 can have a modified error message 554 as dialog text. As shown, modified error message 554 reads, "The application faulted with error 0X00004085. Click Close to exit the program. Error code 1142." In an example, the system can modify error message 554 by using UI automation APIs. UI automation can be built into the operating system, and can be used to change many different attributes of UI elements. For example, with UI automation the text color can be changed (e.g., to red) and the text content can be changed. Similarly, a button label can be changed, e.g. from "Close" to "Exit," or to another language. The size, shape, aspect ratio, colors, fonts and font sizes, and/or other aspects of the appearance of the application and/or its windows or dialogs can also be changed. In various examples, the system can alternatively or additionally modify a locally executed application using hooking or hook messages, or any other technology, and is not limited by the present disclosure.

The system can generate one or more augmented images of error dialog 550, and can use these augmented images to form a dataset for CV ML training, testing, and validation, as described in the example of FIG. 14 below.

Figure 6A:
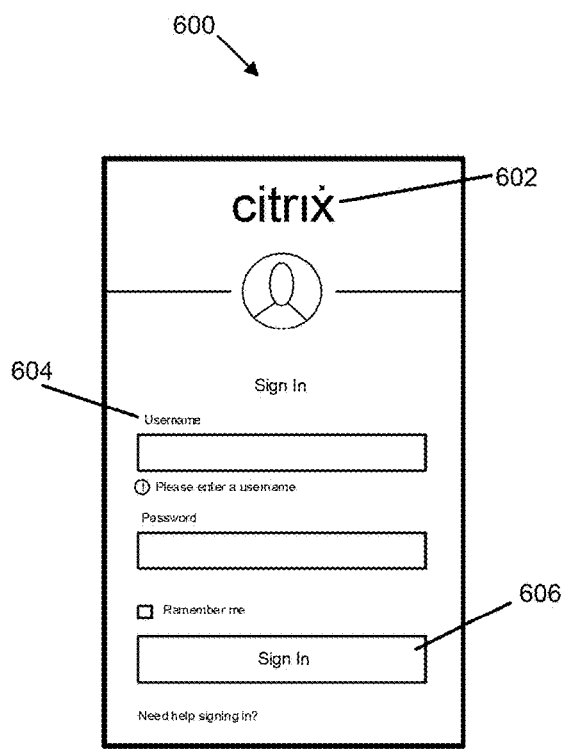
FIG. 6A illustrates an example login web page, in accordance with an example of the present disclosure.

FIG. 6A illustrates an example login web page 600, in accordance with an example of the present disclosure. As shown, login web page 600 can have a logo 602. In this example, logo 602 reads, "Citrix." Login web page 600 can include numerous other UI elements, such as a username entry field, text 604 labeling the username entry field, a "Sign In" button 606, an image, a password entry field, other text labels, and any number of other UI elements.

In an example, login web page 600 may be the original, unmodified version of a login web page. For example, login web page 600 may be a page served by a website or internal intranet site and displayed in a browser client, to enable a user to log into the website or intranet site. In this case, login web page 600 may display logo 602, text label 604, "Sign In" button 606, and other UI elements, unmodified by the disclosed system and methods. The disclosed system and methods can be used to generate many variations on existing software objects, such as login web page 600 from a website or SaaS app, as illustrated in the examples of FIGS. 6B-6D below.

Figure 6B:
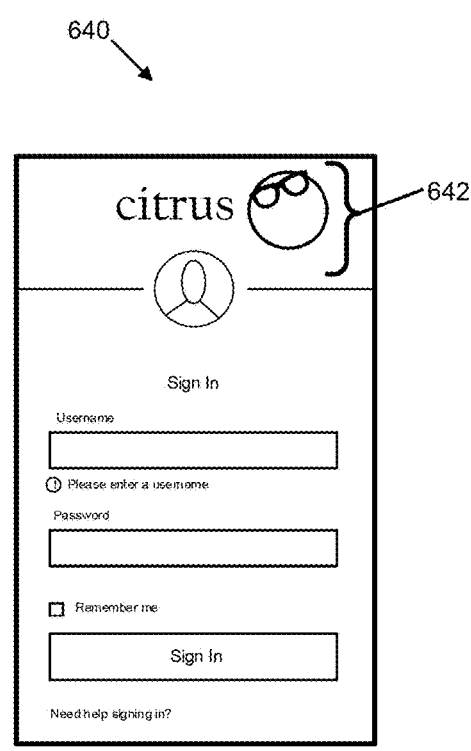
FIG. 6B illustrates an example login web page with an augmented logo, in accordance with an example of the present disclosure.

FIG. 6B illustrates an example login web page 640 with an augmented logo, in accordance with an example of the present disclosure. In this example, login web page 640 may be an augmented version of login web page 600 of the example of FIG. 6A. For example, a user may select login web page 600 and select the logo 602 as an attribute of login web page 600 to be augmented, using the selection methods described above. The user may then specify a new logo 642, for example, by providing logo text of new logo 642, an image file containing new logo 642, or a link or web site address with new logo 642. In another example, the system may obtain new logo 642 from a favicon associated with a link or web site specified by the user. The user may then use the disclosed system and methods to augment login web page 600, resulting in augmented login web page 640.

In particular, login web page 640 has modified logo 642. As shown, the logo text has been modified from "Citrix" to "Citrus," and an image has been added to the logo. In an example, the system can modify logo 642 by modifying HTML of login web page 640, for example a link or "href" target in a tag, such as an "<img>" tag. For example, the system can modify the HTML by downloading and/or saving the HTML of unmodified login web page 600. In some examples, the system may also download and/or save any images or a complete web page of login web page 600. In various examples, the system can alternatively or additionally modify a web page or app based on CSS attributes, Java, JavaScript, or any other web technology, and is not limited by the present disclosure. The system can then modify the HTML or other code or web technology associated with login page 600.

The system can then then load the modified HTML or code, for example, in a standard or headless browser session, thereby generating modified login web page 640. The system can generate one or more augmented images of login web page 640, and can use these augmented images to form a dataset for CV ML training, testing, and validation, as described in the example of FIG. 14 below.

FIG. 6C illustrates an example login web page 660 with augmented text, in accordance with an example of the present disclosure. Login web page 660 may be an augmented version of login web page 600 of the example of FIG. 6A.

In particular, login web page 660 has modified text label 664. As shown, the username entry field text label has been modified from "Username" to "Nom d'utilisateur," which is a translation to French. In some examples, the system can be used to augment software objects by translating any text associated with the software objects to any language. Alternatively or additionally, text can be modified in other ways.

In an example, the system modifies text label 664 by modifying HTML or other source of login web page 640, for example by downloading and/or saving HTML of unmodified login web page 600, or a complete web page of login web page 600. In various examples, the system can modify a web page or app based on CSS attributes, Java, JavaScript, or any other web technology, and is not limited by the present disclosure. The system can then modify the HTML or other code or web technology associated with login page 600. The system can then then load the modified HTML or code, for example, in a standard or headless browser session, thereby generating modified login web page 660. The system can generate one or more augmented images of login web page 660, and can use these augmented images to form a dataset for CV ML training, testing, and validation, as described in the example of FIG. 14 below.

FIG. 6D illustrates an example login web page 680 with an augmented button 686, in accordance with an example of the present disclosure. Login web page 680 may be an augmented version of login web page 600 of the example of FIG. 6A.

In particular, login web page 680 has modified button 686. As shown, the text of button 686 has been modified from "Sign In" to "Create Account," and the font has been changed. In some examples, the system can modify the button color and/or the text color of button 686, or can modify the size, placement, aspect ratio, or any other property of button 686.

As in the examples above, the system may modify button 686 by modifying HTML or other source or web technology of login web page 680. The system can then load the modified HTML or source, for example, in a standard or headless browser session, thereby generating modified login web page 680. The system can generate one or more augmented images of login web page 680 as disclosed herein.

Figure 7A:
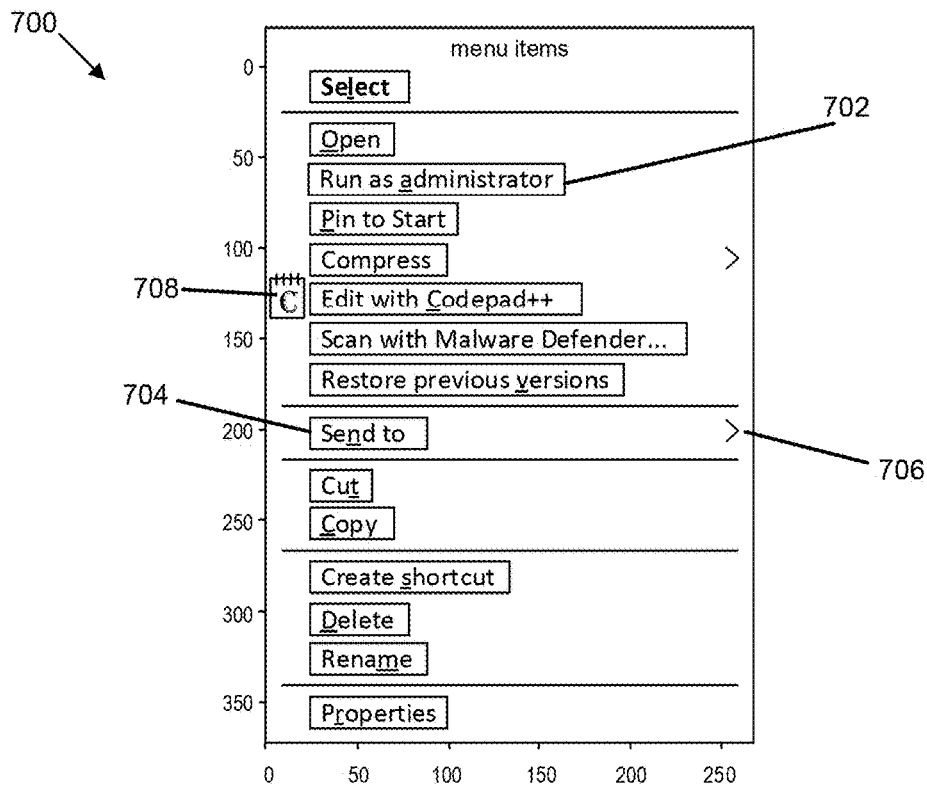
FIG. 7A illustrates an example popup menu, in accordance with an example of the present disclosure.

FIG. 7A illustrates an example popup menu 700, in accordance with an example of the present disclosure. As shown, popup menu 700 has menu items such as menu items 702 and 704, as well as icons such as icons 706 and 708. In this example, menu item 702 reads "Run as Administrator," while menu item 704 reads, "Send to."

In an example, popup menu 700 may be the original, unmodified version of a popup menu. The disclosed system and methods can be used to generate many variations on existing software objects, such as popup menu 700.

Figure 7B:
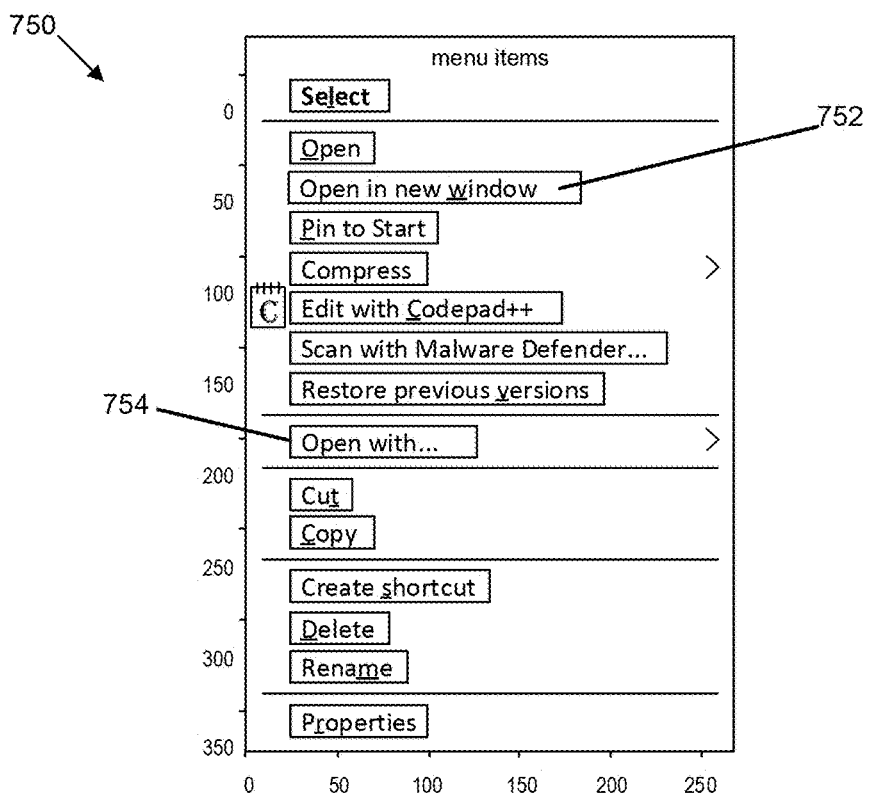
FIG. 7B illustrates an example popup menu with augmented menu items, in accordance with an example of the present disclosure.

FIG. 7B illustrates an example popup menu 750 with augmented menu items, in accordance with an example of the present disclosure. Popup menu 750 may be an augmented version of popup menu 700 of the example of FIG. 7A. In particular, popup menu 750 has modified menu items 752 and 754. As shown, the text of menu item 752 has been modified from "Run as Administrator" to "Open in new window," and the text of menu item 754 has been modified from "Send to" to "Open with. . ." Alternatively or additionally, the system can modify the icons shown within popup menu 750. In various examples, the system can modify the text color, size, or font of the menu items, or can modify the size, placement, aspect ratio, or any other property of popup menu 750.

As in the examples above, the system may modify menu items 752 and 754 by using UI automation APIs or by using hooking or hook messages, or any other technology, and is not limited by the present disclosure. The system can then generate one or more augmented images of popup menu 750 as disclosed herein.

Figure 8:
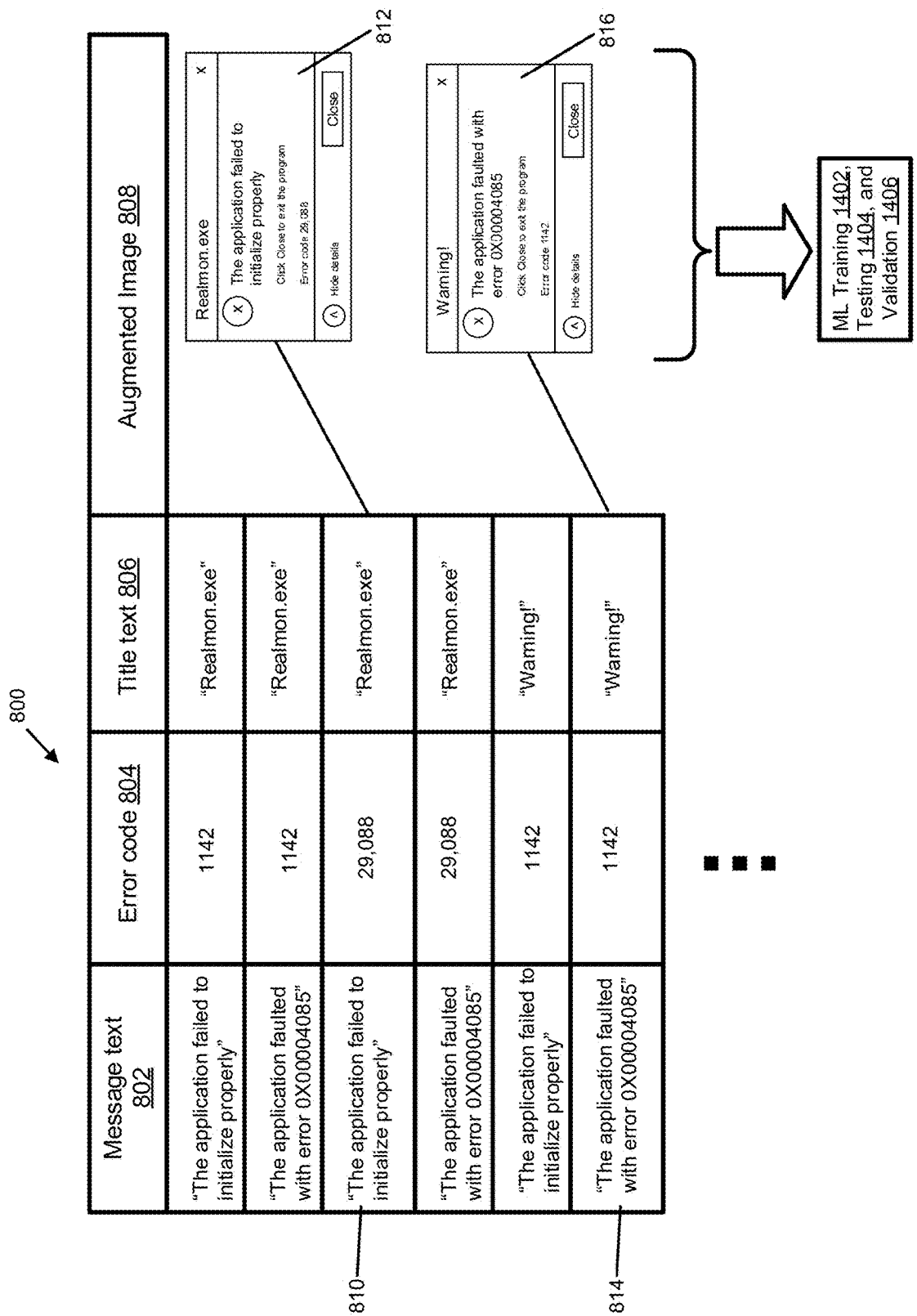
FIG. 8 illustrates an example set of attribute values for augmentation of software objects, in accordance with an example of the present disclosure.

FIG. 8 illustrates an example set of attribute values 800 for augmentation of software objects, such as dialog 300 of the example of FIG. 5A, in accordance with an example of the present disclosure. In this example, the attribute values are schematically shown in a table format, where each attribute value in the set 800 is iterated through in sequence. In particular, the set 800 can include multiple attributes of dialog 300, such as message text 802, error code 804, and title text 806. In some examples, set 800 is not limited to these three attributes, and can also include a window size or aspect ratio, text contents, text size or color, font or font style, a display theme (e.g., dark or non-dark), icon or image (e.g., an error icon in a user dialog can be modified to a different set of error icons), window title size or color, button appearance, button text, or any other attributes in any number or combination. In addition, the software object being augmented according to set 800 can include an executable application, a window, a dialog box, another UI element, a web page, a web app, a SaaS app, or any other software object, and is not limited by the present disclosure.

In this example, the system can iterate through multiple values of message text 802, such as "The application failed to initialize properly" and "The application faulted with error 0X00004085." Likewise, the system can iterate through multiple values of error code 804, such as "1142" and "29,088," as shown. The system can iterate through multiple values of title text 806, such as "Realmon.exe" and "Warning!" While this example illustrates two values of each attribute, the system can iterate through any number of possible values for each respective attribute, and is not limited by the present disclosure. Moreover, in some examples, the system can simultaneously iterate through any and all combinations and/or permutations of the values of these different attributes. For example, the combination of attributes shown in row 810 results in augmented software object 812. Likewise, the combination of attributes shown in row 814 results in augmented software object 816.

As described above, the system can obtain the attributes 802, 804, and 806 by user input or user selection, for example, based on a menu of possible options. In some examples, the system can generate some or all of the list of attribute values. Accordingly, by generating attribute values with less user interaction, the system may generate a large number of augmented software object images more expeditiously and efficiently. For example, the system can randomly generate attribute values (e.g., by using a pseudorandom number generator to generate a numerical value such as error code 804, or to select among the possible options of non-numerical values), include all possible attribute values in the list, or make use of natural language generation technology to generate values for text attributes, such as message text 802 or title text 806.

The system can generate augmented images 808 of the augmented software objects. These augmented images 808 can be used to form a dataset of augmented images for CV ML training 1402, testing 1404, and validation 1406, as in the example of FIG. 14 below. In particular, the number of combinations and/or permutations of attribute values may be quite large, resulting in a very large dataset for training 1402, testing 1404, and validation 1406. For example, if five attributes are augmented, with ten attribute values each, then a total of $10^5$ or 100,000 augmented images may result. In some examples, the system can generate thousands, hundreds of thousands, or even millions or more of augmented software object images for datasets for training 1402, testing 1404, and validation 1406.

In some examples, the system can modify the position of the target software object or an image thereof. In some examples, the system can modify the position of the target software object or an image thereof overlaid over a background, as in the examples of FIGS. 9A, 9B, and 13.

Figure 9A:
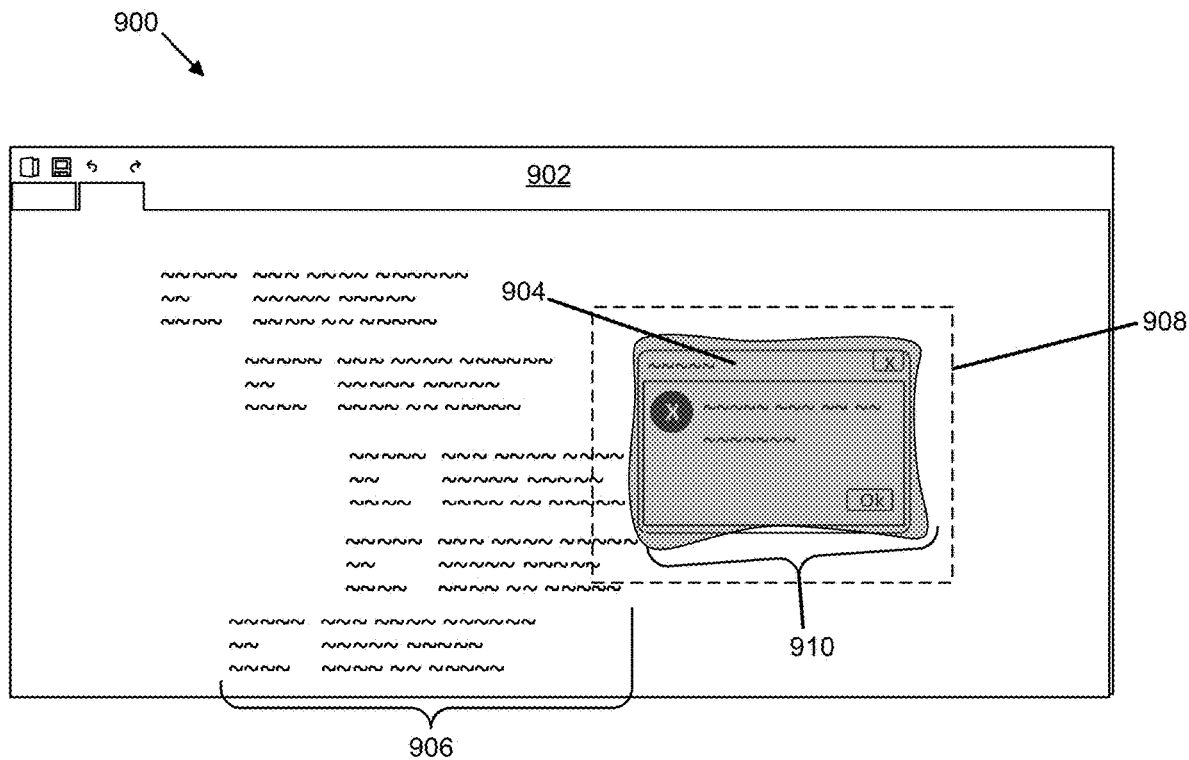
FIG. 9A illustrates a dialog overlaid over a background application, in accordance with an example of the present disclosure.

FIG. 9A illustrates a dialog 904 overlaid over a background application window 902, in accordance with an example of the present disclosure. In some examples, the system can modify the position of a software object. For example, the system can move the software object, such as the dialog 904 in this example, overlaid over a background, such as background application window 902, which contains text 906 in this example, such as a word processing document, programming code, or a script. The background may remain unmoved while the foreground object 904 can be moved. In various examples, the system can modify the position of the foreground object according to a set method, such as the process described in the example of FIG. 13 below, or can apply any portion of that process, and is not limited by the present disclosure.

Modifying the position of the foreground object can enable the system to be trained to recognize a foreground software object, such as dialog 904 in this example, in front of a potentially complex background, such as background application window 902 containing text 906. For example, the system can generate a dataset of augmented images for CV ML training 1402, testing 1404, and validation 1406, with the foreground object 904 overlaid in different positions over the background 902.

Figure 9B:
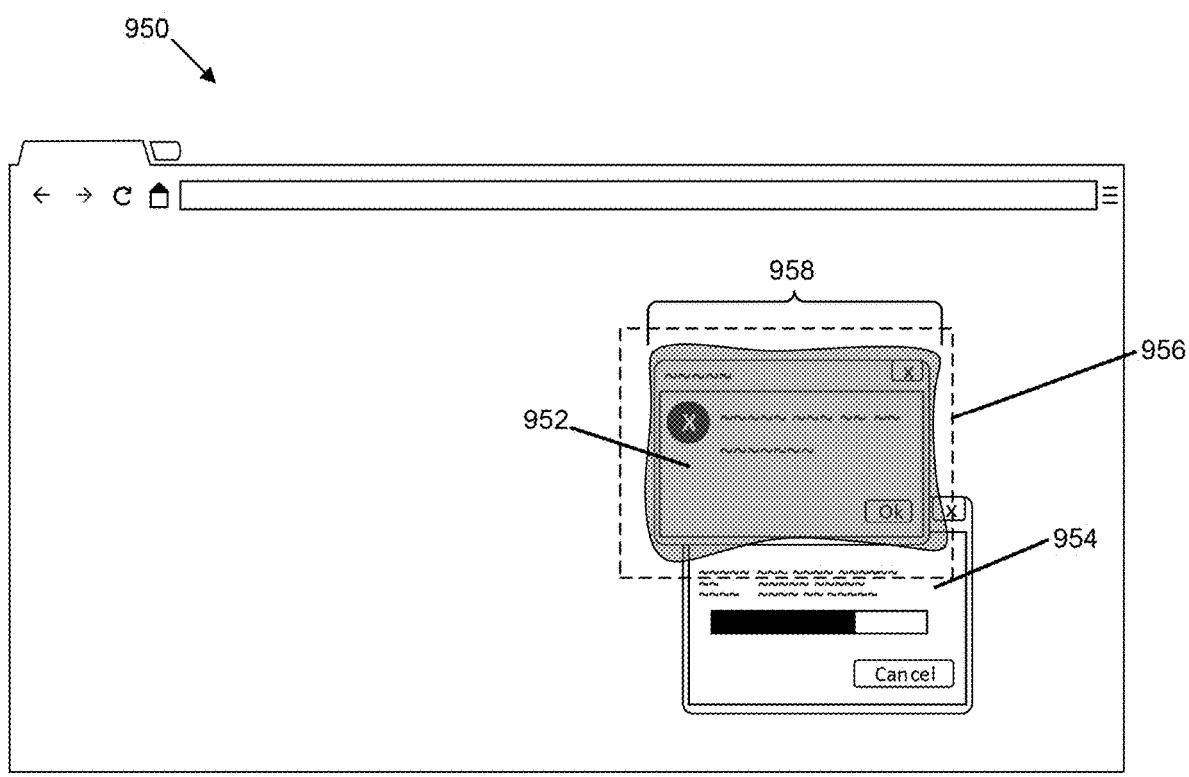
FIG. 9B illustrates a dialog overlaid over another dialog, in accordance with an example of the present disclosure.

FIG. 9B illustrates a dialog 952 overlaid over another dialog 954, in accordance with an example of the present disclosure. In this example, the system can move the foreground dialog 952, overlaid over the background dialog 954. The background dialog 954 may remain unmoved while the foreground dialog 952 is moved. The system may modify the position of the foreground dialog 952 according to the process described in the example of FIG. 13 below, or according to portions of method 1300. Modifying the position of foreground dialog 952 can enable the system to be trained to recognize a dialog such as dialog 952 in front of a potentially complex background, such as background dialog 954.

In the examples of FIG. 9A and 9B, the system can generate training information, such as class labels (e.g., whether a software object is an error dialog, a warning dialog, another type of window, or the like), bounding boxes 908 and 956, and masks 910 and 958, more efficiently and expeditiously than some techniques for image dataset augmentation. As a result, the system can generate large training datasets, enabling the CV ML model to recognize foreground objects in front of potentially complex backgrounds successfully. For example, the disclosed system and methods can train a CV ML model to classify, localize, and perform instance segmentation on individual foreground software objects by determining class labels, bounding boxes, and masks for the foreground software objects.

In some examples, the system can generate the combined or augmented image by moving the foreground software object in front of the background software object. In other examples, the system can generate the combined or augmented image using images of the foreground and/or background objects. For example, the system can overlay an image of foreground dialog 904 over an image of background application window 902, or an image of foreground dialog 952 over an image of background dialog 954.

Figure 10:
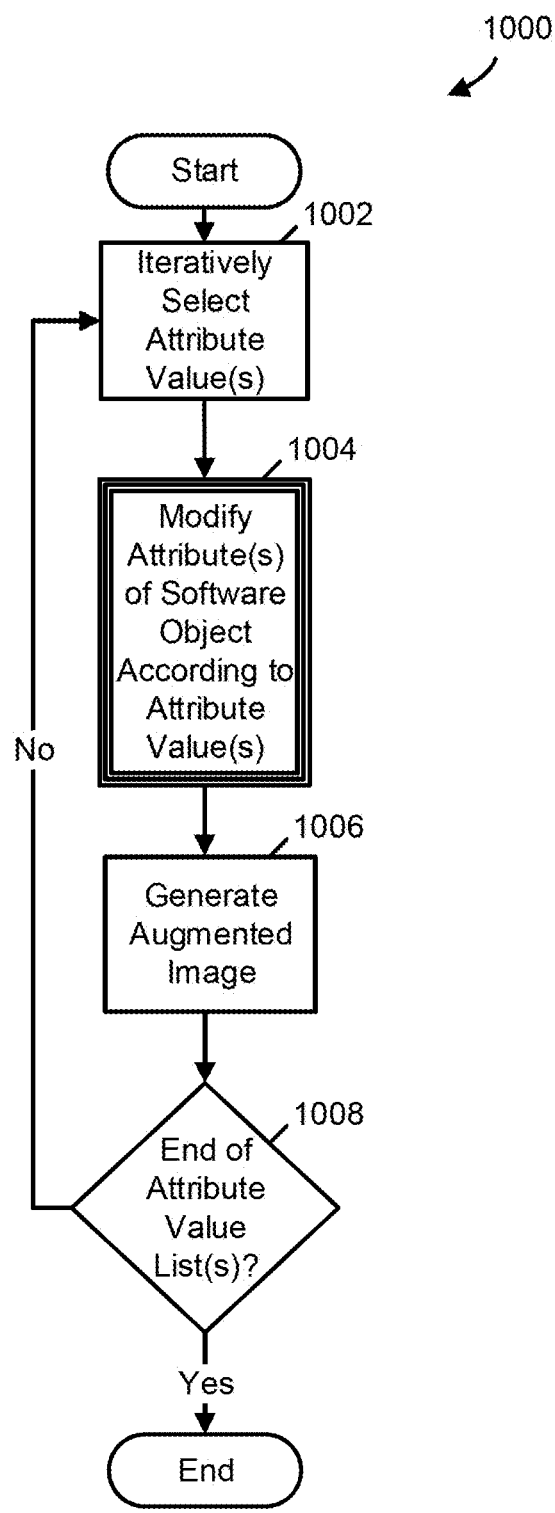
FIG. 10 is a flow diagram of a process for augmenting images of software objects in accordance with an example of the present disclosure.

FIG. 10 is a flow diagram of a process 1000 for augmenting images of software objects in accordance with an example of the present disclosure. In this example, process 1000 may provide additional details of process 1100 for receiving a selection of software object UI elements and attributes for augmentation in FIG. 11 below. In various examples, process 1000 may be executed by a client device and/or data augmentation tool executing on a client device, or may be implemented within a virtualization infrastructure, as described in the example of FIG. 15 below.

As shown in FIG. 10, the process for augmenting images of software objects starts with the data augmentation tool or the client device iteratively selecting 1002 an attribute value to modify from a predetermined set of attribute values. In an example, the augmentation process can iterate through multiple attributes simultaneously, as described in the example of FIG. 8 above, and therefore in operation 1002 can select a permutation or combination of values for the multiple attributes. For example, the system may iterate through the values of the multiple attributes using nested loops, or by selecting combinations in any other way.

If the target application for augmentation is a web page, the system can download and save the page, for example in HTML, as a complete web page, or in any other web technology format. The system can then iterate upon the saved web page in a headless browser session or a standard browser session. For example, the system may even use the same session the user uses to open the target web page and select attributes (as in FIG. 4 above). If the target application is locally executed, the system can use the same window the user uses to select attributes (as in FIGS. 3A-3C above).

Next, the data augmentation tool or the client device can modify 1004 one or more attributes of a target software object according to the attribute value or values selected in operation 1002. As described above, the data augmentation tool can use UI automation APIs, HTML, DOM, and CSS attributes to modify the software object's attributes. In some examples, the system can modify the position of the target software object or an image thereof. In some examples, the system can modify the position of the target software object or an image thereof overlaid over a background, as in the examples of FIGS. 9A, 9B, and 13.

Next, the data augmentation tool or the client device can generate 1006 a respective augmented image of the software object with the attribute modified according to the attribute value. For example, the system can take a snapshot image of a window, control, or region of the display specified by the user, and can save the generated image in a file.

Alternatively, in some examples, the system can automatically determine the display region for the snapshot, e.g. based on the selection of UI elements and/or attributes for augmentation. For example, if a user selected a button for augmentation, then the system may determine (e.g., based on a hierarchy of UI elements) that the selected button is part of a dialog or a window, and may accordingly determine that the snapshot image should be taken of the entire dialog or window. For example, the system can use hooking and/or HTML to determine the hierarchy of UI elements, such as determining that a selected UI element belongs to a particular dialog or window, and to determine the coordinates and dimensions of the dialog or window. The system can then determine that the display region of the snapshot should correspond to the dialog or window.

Next, the data augmentation tool or the client device can determine 1008 whether there are additional attribute values to iterate over. For example, if the user has specified a predetermined set of values for a single attribute, the system can determine whether it has iterated over the entire set. In another example, if the user specified sets of values for multiple attributes, the system can determine whether any combinations of values remain to iterate over. In case there remain attribute values or sets of values to iterate over, the system can return to repeat operations 1002-1006. In case all the attribute values have already been iterated over, the system can complete process 1000.

Figure 11:
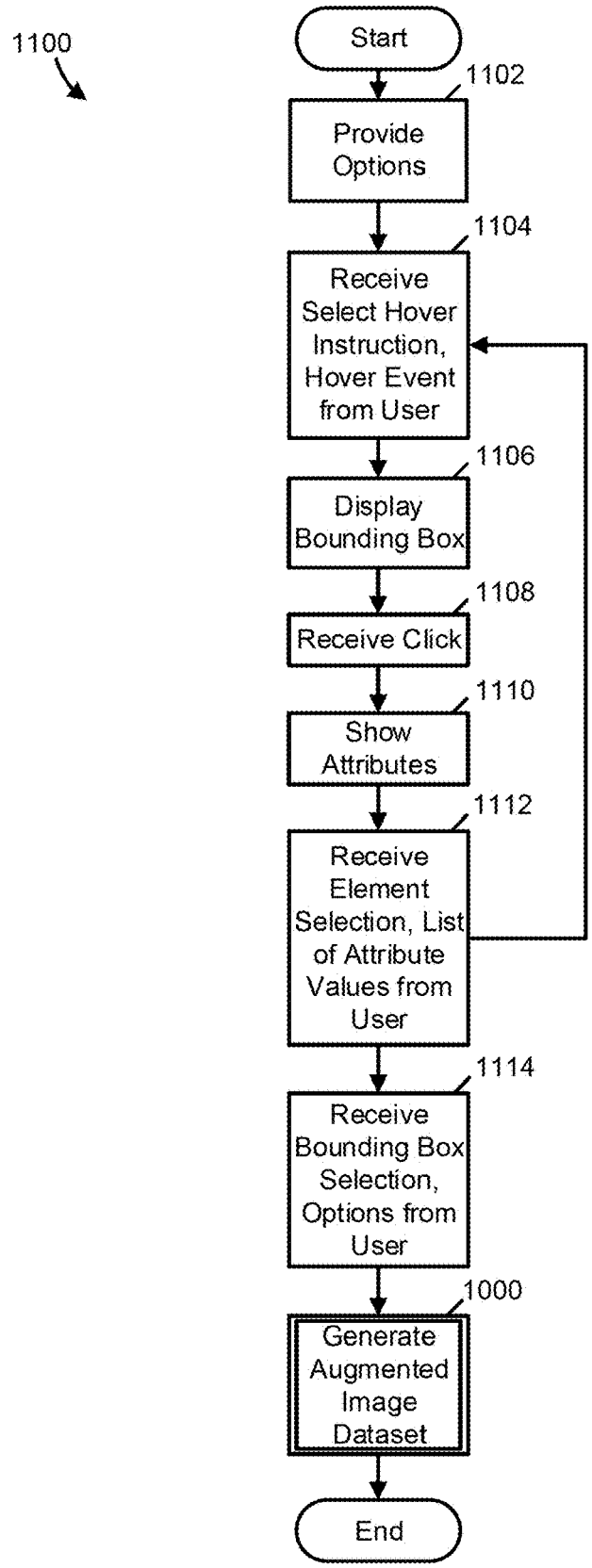
FIG. 11 is a flow diagram of a process for receiving a selection of software object UI elements and attributes for augmentation, in accordance with an example of the present disclosure.

FIG. 11 is a flow diagram of a process 1100 for receiving a selection of software object UI elements and attributes for augmentation, in accordance with an example of the present disclosure. Prior to the start of process 1100, a user, such as an administrator or data scientist, may launch a locally executed application or navigate to a URL of a web or SaaS app and to a dialog, window, or page that is a target for augmentation to train, test, or validate a CV ML model. In various examples, process 1100 may then be executed by a client device and/or by a data augmentation tool executing on a client device. For locally executed target applications, the data augmentation tool can be integrated with the workspace client app, or be triggered as a standalone tool. Alternatively, if the target app for augmentation is a web or SaaS app, the data augmentation tool may be a browser extension, or be part of a web browser, for example for an embedded browser (e.g., chromium-based browser).

As shown in FIG. 11, the selecting UI elements and attributes process starts with the data augmentation tool providing 1102 the user with various options to select UI or HTML elements of the target application for modification. For example, the data augmentation tool can use UI automation, hook messages, HTML, DOM, CSS, and the like to query the target application and retrieve the UI or HTML elements and their properties, and present these as choices to the user. Furthermore, the data augmentation tool can provide the user options to view and select attributes for each UI or HTML element, such as color, size, title, text, location, etc. The data augmentation tool can also enable the user to specify a list or range of augmented values for each selected attribute of each UI or HTML element. For example, if the attribute is the color of a button, the system may receive a list from the user of plain-language color names such as "red," "blue," "green," and/or RGB values, hexadecimal color values, choices from a color palette, or any other representation of colors, or any combination thereof. In another example, the system can change a "label1" text property (e.g., a label for a button, text entry field, or window title), to use text values from a list, storage, file, etc. In another example, the system can receive a user specification of the region in the page for which the image should be taken for data augmentation.

Next, the data augmentation tool can receive 1104 a user selection of an option to select a UI or HTML element by hovering. In response to this selection, the data augmentation tool can disable interactions with the page, dialog, or window, for example redirecting all mouse events so that if the user clicks, the click event is received by the data augmentation tool, and not by the target application to be augmented. Redirecting mouse click events can facilitate identifying a UI or HTML element the user clicks as a data augmentation target. The data augmentation tool can then receive a pointing device hover event (e.g., mouseover) over the page, window, or dialog, thereby provisionally selecting one or more UI or HTML elements, as in the example of FIGS. 3A-3B and 4 above.

Next, the system can display 1106 the element with an indication that the element is being hovered over, for example a bounding box as in the examples of FIGS. 3A-3B and 4. In various examples, the system may use a UI automation API, hooking, a modified HTML document, a modified DOM, a modified CSS attribute, or a data augmentation toolbox to display such a bounding box or indication.

Next, the system can receive 1108 a mouse click event, thereby completing the selection of the one or more elements targeted for augmentation. In an example, the elements can be provisionally selected by the hover event in operations 1104 and 1106, and can be fully selected by the mouse click event in operation 1108. In some examples, the system can receive multiple element selections, and can accordingly display multiple persistent bounding boxes around all the simultaneously selected elements. In a further example, the system can provide the user an option to unselect an element, for example, by repeating the selection process to toggle the selection. The user can then select a new element.

Next, the data augmentation tool can display 1110 various attributes of the selected element. For example, the data augmentation tool can use UI automation, hook messages, HTML, DOM, CSS, and the like to query the target application and retrieve attributes of the target elements, and accordingly present these attributes as options for augmentation.

The data augmentation tool can receive 1112 a selection of one or more attributes to iterate over, and an associated set of attribute values for each attribute. For example, the tool may receive a selection to modify a label, value, or text attribute. In this case, the tool may also receive a list of strings (e.g., in a comma-separated format, as a pathname for a file containing the values, etc.). In another example, the tool can receive a selection to modify the color of text or change a control, as well as a list of RGB values, hexadecimal codes, or plain-language names to iterate.

In an example, the user wishes to select multiple UI or HTML elements for augmentation. Accordingly, the system can repeat operations 1104-1112, thereby permitting the user to select additional elements and attributes, as well as to specify attribute values and/or other data with which to augment the selected attributes. As described in the example of FIG. 8 above, when generating the augmented images, the system can then iterate over any and all combinations or permutations of selected elements, as a result generating exponentially larger datasets.

Next, the data augmentation tool can receive 1114 a selection of the outer region or bounding box using which the image should be taken. For example, the user may specify a region in the user's client display by dragging with a mouse or other pointing device, or may indicate a window, dialog, or portion thereof by hovering, pointing, and/or clicking. In response, the system may record a particular display region, such as a rectangular region and/or a set of display pixels, and may use the recorded region to generate the images. For example, when generating the augmented images, the system can generate the images as a snapshot of that region of the display after augmenting the target application and/or UI or HTML elements. Alternatively or additionally, the system may record a particular selected window, dialog, or other control, and may generate images of the window, dialog, or control after augmenting the target application and/or elements.

In addition, the tool can receive input specifying any options relevant for generating the images, such as a directory, path, networked drive, or server where the image files should be generated and other configurations like any file-naming prefix, suffix, or sequence number to be used in generating the augmented data files.

Finally, the data augmentation tool can generate 1000 an augmented image dataset. For example, the system can execute process 1000 for augmenting images of software objects as described in the example of FIG. 10 above.

Figure 12:
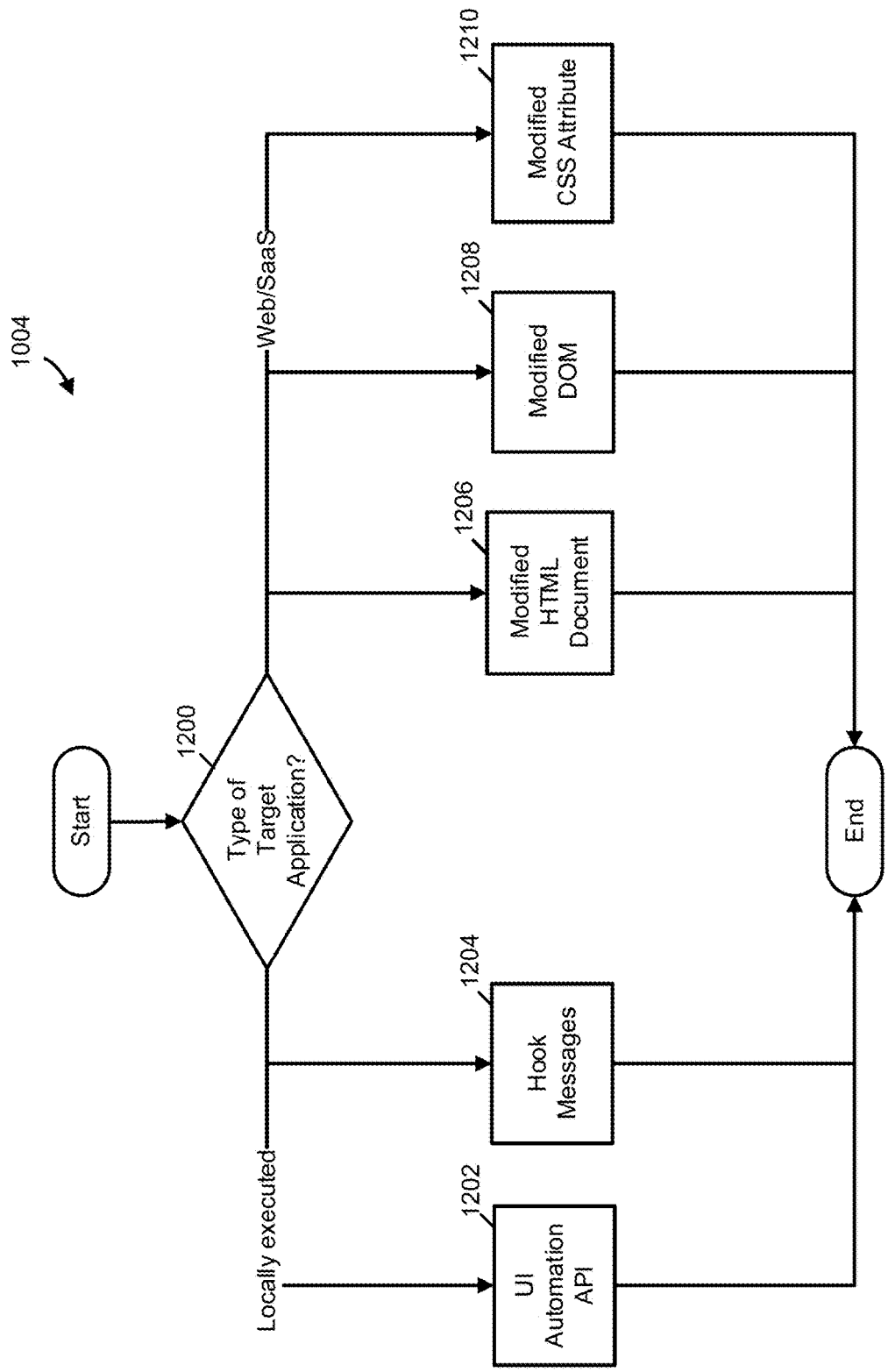
FIG. 12 is a flow diagram of a process for modifying attributes of software objects, in accordance with an example of the present disclosure.

FIG. 12 is a flow diagram of a process 1004 for modifying attributes of software objects, in accordance with an example of the present disclosure. In this example, process 1004 may provide additional details of operation 1004 for modifying attributes of a target software object according to predetermined attribute values in FIG. 10 above. For example, process 1004 illustrates some of the alternative methods by which the disclosed system can augment, query, control, and/or modify the target software object, whether a locally executed application, window, dialog, or control, or a web page, web app, or SaaS app. This can include, for example, modifying a mouse or pointing cursor, displaying a bounding box or other indication of selection, querying attributes and attribute values, and modifying attributes and attribute values, but is not limited by the present disclosure. In various examples, process 1004 may be executed by a client device and/or data augmentation tool executing on a client device.

As shown in FIG. 12, the process for modifying attributes of software objects starts with determining 1200 the type of target application. In some examples, the data augmentation tool or the client device can make the determination 1200. In other examples, a user, such as an administrator or data scientist, can determine 1200 the type of target application, and execute the appropriate data augmentation tool.

If the target software object is a locally executed application, window, dialog, or other control, the data augmentation tool or the client device can execute a UI automation API 1202 and/or receive and send hook messages 1204. For example, the data augmentation tool or client device can use UI automation API 1202, hook messages 1204, or another technology to augment, query, control, and/or modify the target software object. In some examples, UI automation API 1202 or hook messages 1204 can include techniques and instructions to communicate with operating system processes, as described in the example of FIG. 15 below. In this case, the data augmentation tool may include a specialized module for augmenting, querying, controlling, and/or modifying the target software object, which may be triggered from the workspace client app, or as a standalone data augmentation toolbox such as data augmentation toolbox 1504 of FIG. 15 below.

Alternatively, if the target software object is a web page, web app, or SaaS app, the data augmentation tool or the client device can use a modified HTML document 1206, a modified DOM 1208, and/or a modified CSS attribute 1210, or another technology. For example, the data augmentation tool or the client device can use these technologies to augment, query, control, and/or modify the target software object. In this case, the data augmentation tool can be a browser extension, or may be provided as part of the browser, for example for an embedded browser (e.g., chromium-based browser). In some examples, a standalone data augmentation toolbox can also be used to augment a web page, web app, or SaaS app, or the data augmentation tool can be integrated into the workspace client app.

In some examples, the data augmentation tool or client device may download and/or save HTML 1206, a DOM 1208, images, CSS attributes 1210, JavaScript, Java, any other code, script, or web technology, or a complete target web page or web app. The system can additionally modify these documents, scripts, codes, or web technologies associated with the target web page or web app, and can iteratively load the modified documents, codes, or web technologies, for example in a headless or standard browser session, and generate augmented images of the target software object, as disclosed herein.

Figure 13:
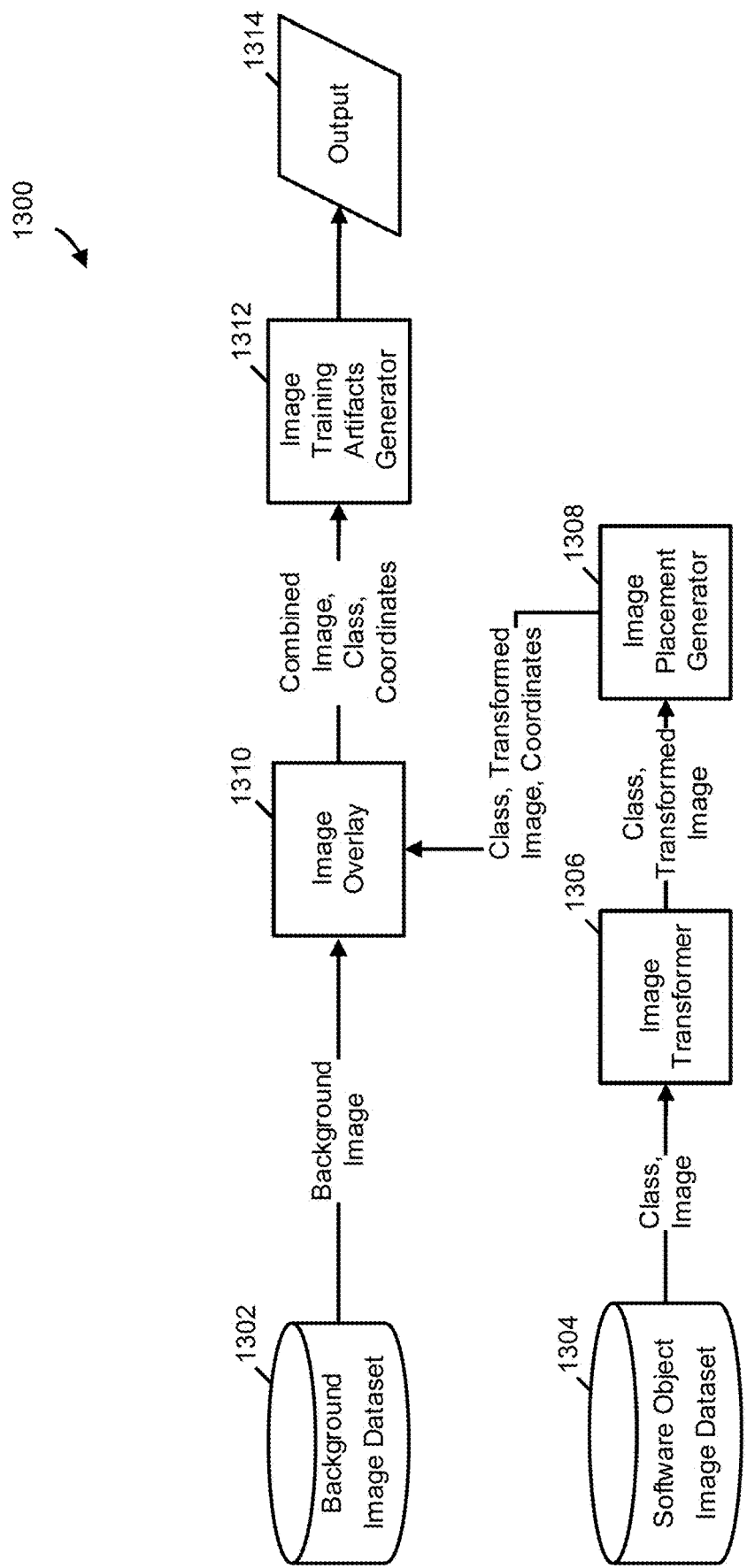
FIG. 13 is a block diagram of an example system for augmenting an image of a foreground software object over a background, in accordance with an example of the present disclosure.

FIG. 13 is a block diagram of an example system 1300 for augmenting an image of a foreground software object over a background, in accordance with an example of the present disclosure. In various examples, system 1300 may be implemented by a client device and/or a data augmentation tool executing on a client device. System 1300 may augment an image of a foreground software object over a background, as in the examples of FIGS. 9A and 9B above, and may generate a dataset for CV ML training, testing, and validation, as described in the example of FIG. 14 below. In some examples, system 1300 can generate a combined or augmented image by moving a foreground software object in front of a background software object. In other examples, the system can generate the combined or augmented image using images of the foreground and/or background objects.

As shown in FIG. 13, the system 1300 for augmenting an image of a foreground software object over a background can include a background image dataset 1302 and a software object image dataset 1304, which can be stored in one or more memories and/or data stores accessible by system 1300. The system can obtain a first input, such as a background application or an image thereof. For example, the system may randomly select a background application image from background image dataset 1302.

The system can also obtain a second input, such as a foreground software object or an image thereof, and a class label of the foreground software object. The foreground software object or image thereof can be a training example of a software object to be detected and segmented by a CV ML model. The class label can be the type of the foreground software object, for example an error dialog, a warning dialog, an application window, etc. For example, the system may randomly select a foreground software object image from software object image dataset 1304, and/or may randomly select a foreground software object class, and a foreground software object image based on the selected class.

System 1300 can implement an image transformer 1306, which can obtain the second input including the foreground software image, and can transform the foreground software object image by modifying various attributes such as dimensions, brightness, and the like, while keeping the aspect ratio and ensuring dimension change is a small percentage.

The system 1300 can also include an image placement generator 1308, which can obtain the class and the modified foreground software object image, and modify the position of the foreground software object image. For example, image placement generator 1308 can randomly generate a new set of coordinates, where the modified foreground software object image can be overlaid over the background image of the first input. In some examples, the image placement generator 1308 can ensure not to generate coordinates that clip the transformed image, for example by causing part of the image to be beyond the display limits when placed. In some examples, the image placement generator 1308 can ensure not to generate coordinates which might be unrealistic, for example, image placement generator 1308 can avoid placing an error dialog at a corner of a display or of an application window.

The system 1300 can also include an image overlay 1310, which can obtain the first input including the background image, as well as obtain the class, the modified foreground software object image, and the modified coordinates from the image placement generator 1308. Image overlay 1310 can overlay the modified foreground software object image over the background image of the first input, in order to generate a combined image, as in the examples of FIGS. 9A and 9B above.

The system 1300 can also include an image training artifacts generator 1312, which can obtain the combined image from image overlay 1310, as well as obtain the class label and modified coordinates. In order to use the new generated combined or augmented image in a CV ML model training, testing, or validation dataset for object detection and segmentation, the image training artifacts generator 1312 can generate training artifacts such as a class label, bounding box, and mask, as illustrated in the examples of FIGS. 9A and 9B above. The class label can correspond to the class (e.g., error dialog, warning dialog, application window, etc.) that was selected as the second input. The bounding box can be based on the coordinates generated by the image placement generator 1308. Likewise, the image training artifacts generator 1312 may also generate the mask data from the coordinates generated by the image placement generator 1308. Finally, the new image with its training artifact data can be stored as the output 1314 of system 1300.

The system 1300 can iterate this process multiple times, in whole or in part, thereby generating a very large image augmentation data set, which does not require any manual labeling, bounding box and masking effort. In some iterations, system 1300 may perform image placement and overlaying, but not image transformation. In some iterations, system 1300 may perform image transformation, but not image placement and overlaying. In some iterations, system 1300 may perform this process in combination with other image augmentation processes described herein, for example, process 1000 for augmenting images of software objects of the example of FIG. 10 above, in whole or in part.

Figure 14:
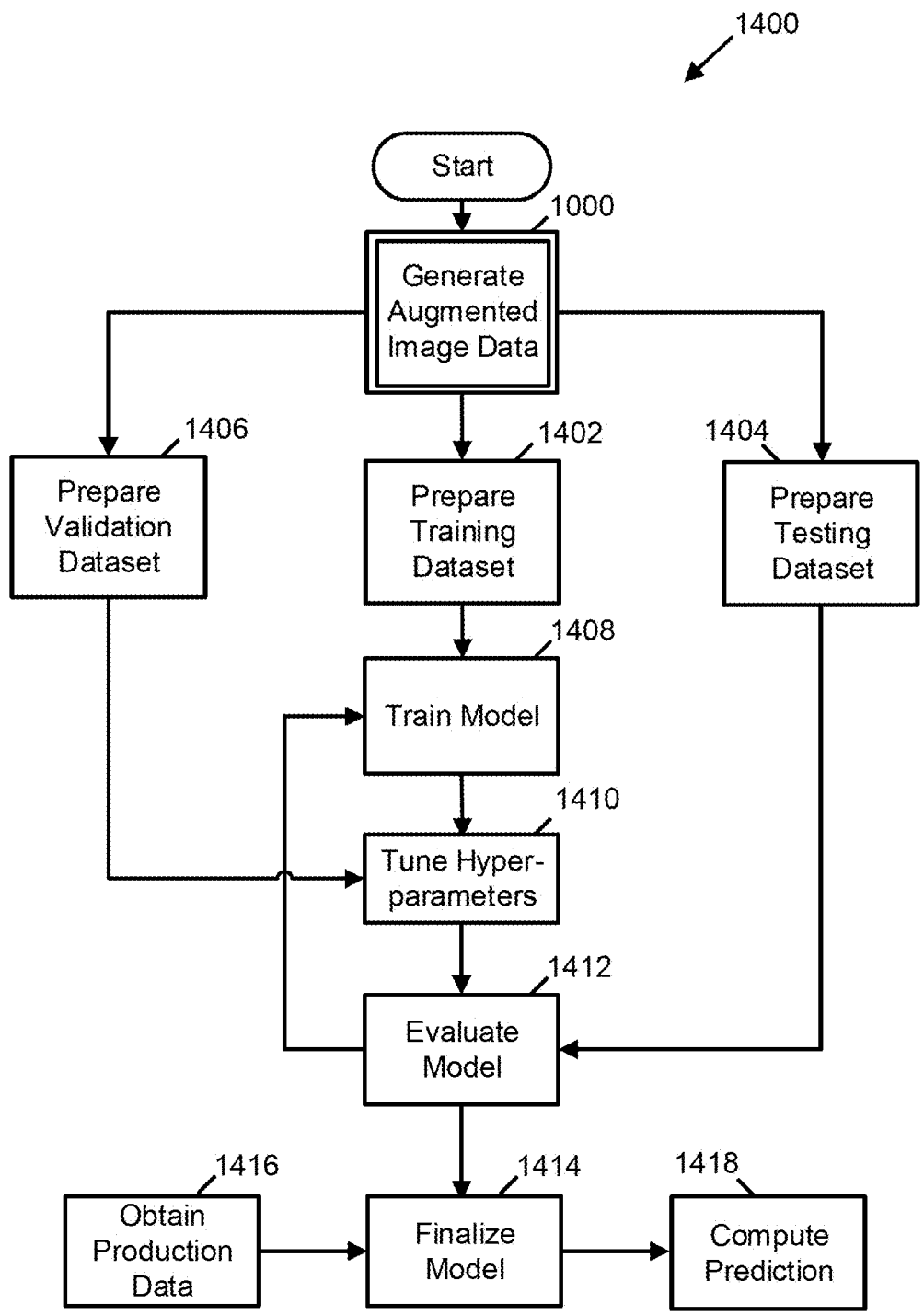
FIG. 14 is a flow diagram of a process for training, testing, and validating a CV ML model, in accordance with an example of the present disclosure.

FIG. 14 is a flow diagram of a process 1400 for training, testing, and validating a CV ML model, in accordance with an example of the present disclosure. For example, the CV ML process may include TensorFlow models or neural networks including Convolutional Neural Networks, etc. A CV ML model may require a very large dataset of images to train the model, in order to improve generalization, thereby reducing overfitting. Likewise, testing and validation also require large image datasets.

As shown in FIG. 14, the training, testing, and validation process starts with generating 1000 augmented data. For example, process 1000 for augmenting images of software objects can be implemented as described in the example of FIG. 10 above.

Next, training 1402, testing 1404, and validation 1406 datasets can be prepared to train parameters, test parameters, and tune hyperparameters of the CV ML model, respectively. These three datasets can be prepared using the augmented images generated in operation 1000, as disclosed herein. For example, certain portions of the generated augmented images can be prepared for the training 1402, testing 1404, and validation 1406 datasets, such as 70%, 20%, and 10%, respectively. The model may not use the testing 1404 and validation 1406 datasets during the training 1402 phase. Accordingly, testing dataset 1404 can reduce the risk of overfitting the model based on the training dataset 1402, while the validation dataset 1406 can reduce the risk of underfitting or overfitting based on the testing dataset 1404.

In some examples, a technique such as k-fold cross-validation can be used to reduce the need for a separate validation dataset 1406.

Preparing the training dataset 1402 can be followed by training the model 1408 to obtain trained parameter values, such as node weights. For example, the parameters of a model for recognizing a software object could correspond to features like the size and shape of a window, the number and placement of buttons, and the size, color, and placement of the title bar.

Preparing the validation dataset 1406 can be followed by tuning hyperparameters 1410. For example, the hyperparameters can include model arguments (such as model hyperparameters and/or algorithm hyperparameters) configured to control the ML, and in some examples may be set before learning. For example, the hyperparameters for various ML techniques may include a regularization constant and/or a kernel type for support vector machines (SVMs), a number of layers, a number of units per layer, and/or regularization for neural networks, a learning rate, and/or a mini-batch size. In some examples, the hyperparameters can be optimized using grid search or random search techniques. Tuning the hyperparameters 1410 may be based on the validation dataset 1406.

Alternatively, in some examples a k-fold cross-validation technique can be used to validate the model's generalizability, while further expanding the effective sizes of the training 1402 and testing 1404 datasets. In such examples, the generated augmented image data 1000 may be randomly divided into k groups. For example, k may be set to ten or to some other value. One of the k groups may be held out as a test dataset 1404, while the remaining k-1 groups may be combined into a training 1402 dataset. In such an example, a validation 1406 dataset may not be needed. The trained model may then be evaluated on the test group, and the evaluation score may be kept. In some examples, the system may iteratively select each one of the k groups as the test group, and may compute the resulting average of the k evaluation scores. Applying such a k-fold cross-validation technique may provide an estimate of the generalizability of the model on independent data, and may help to reduce model bias.

Finally, based on the trained model 1408 and testing dataset 1404, the model can be evaluated 1412. When the model has been evaluated 1412, the production model can be determined 1414, and using production data 1416, a prediction can be computed 1418. For example, for recognizing an error dialog, the determined production model could include optimized parameters corresponding to features like the size and shape of the dialog, the number and placement of buttons, and the size, color, and placement of the title bar. The production data could include live or recorded session video from user sessions in the workspace client app, which may include instances of the error dialog. Accordingly, the prediction could include a classification of a given image of a software object from frames of the live or recorded session video as an instance of the error dialog based on the production model.

Computer System Configured to Augment Images of Software Objects

In some examples, a computer system is configured to augment images of software objects. These software objects can include any process capable of displaying information within the UI of a client device, such as locally executed applications, web applications, SaaS applications, and the like.

Figure 15:
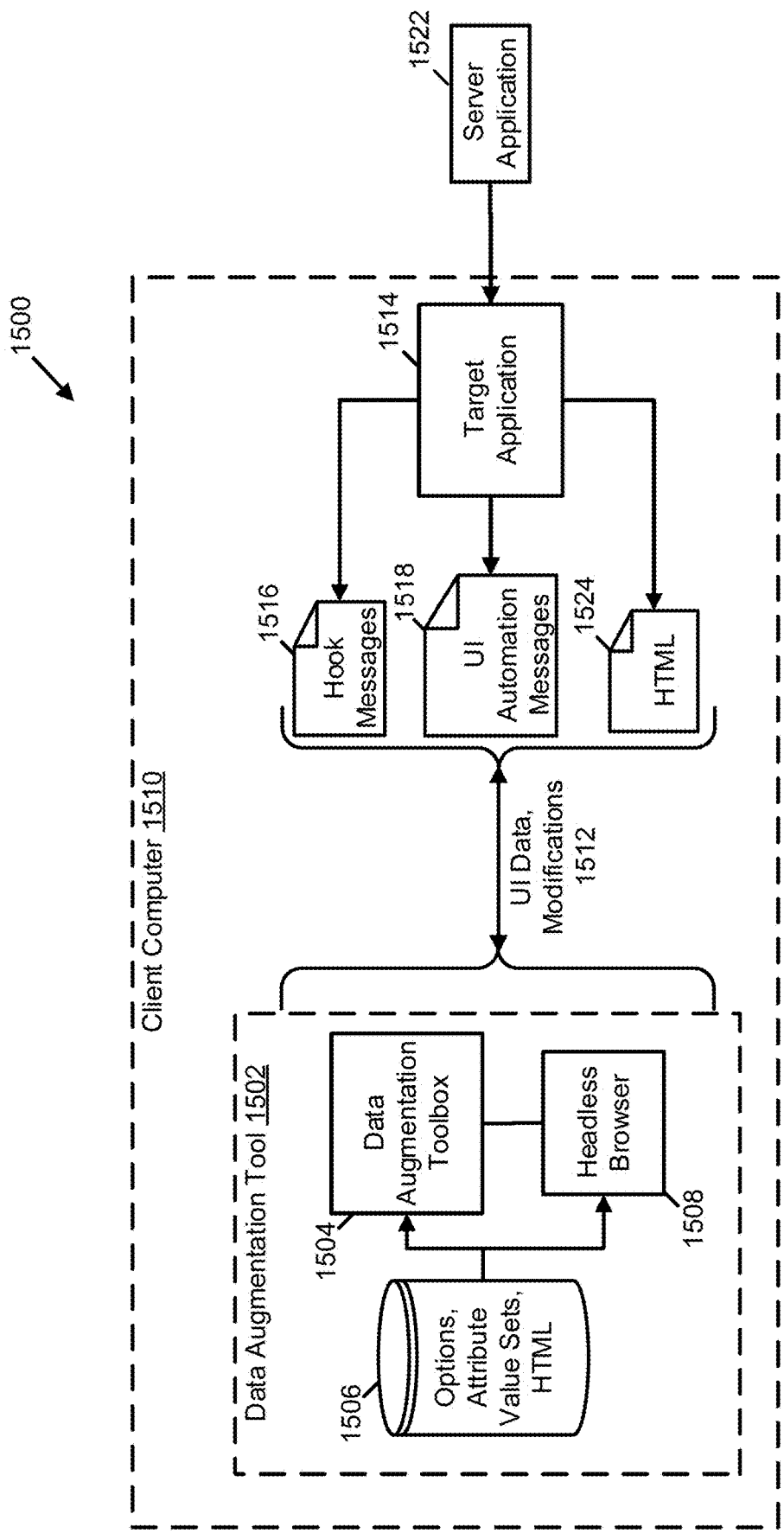
FIG. 15 illustrates a logical architecture of a software object image augmentation system in accordance with some examples.

FIG. 15 illustrates a logical architecture of a software object data augmentation system 1500 in accordance with some examples. As shown in FIG. 15, the system 1500 includes a data augmentation tool 1502, which can include a data augmentation toolbox 1504 and/or a browser 1508, as well as a data store 1506 for user options, attribute values, and HTML or other documents. In various examples, data augmentation toolbox 1504 can be a standalone locally executed application, or can be integrated into the workspace client app, and/or an extension in an embedded browser. FIG. 15 also illustrates a target application 1514 presented by a client computer 1510, such as the client device 1600 of the example of FIG. 16 below. Target application 1514 may include a locally executed application, web application, SaaS application, an application hosted by a server, or another application.

Alternatively or additionally, in some examples, the systems and processes are implemented within a virtualization infrastructure. A first and second virtualization agent are configured to interoperate within the virtualization infrastructure. This virtualization infrastructure enables an application executing within a first physical computing environment (e.g., server 1522 and/or another server) to be accessed by a user of a second physical computing environment (e.g., the endpoint device such as client computer 1510) as if the application was executing within the second physical computing environment. Within the virtualization infrastructure, the first virtualization agent is configured to make a computing environment in which it operates available to execute virtual computing sessions. The first virtualization agent can be further configured to manage connections between these virtual computing sessions and other processes within the virtualization infrastructure, such as the second virtualization agent. In a complementary fashion, the second virtualization agent is configured to instigate and connect to the virtual computing sessions managed by the first virtualization agent. The second virtualization agent is also configured to interoperate with other processes executing within its computing environment (e.g., the workspace client app, which may also be referred to as a digital workspace client) to provide those processes with access to the virtual computing sessions and the virtual resources therein. Within the context of a Citrix HDX™ virtualization infrastructure, the first virtualization agent can be implemented as, for example, a virtual delivery agent installed on a physical or virtual server or desktop and the second virtualization agent can be implemented as a local service in support of the workspace client app. In this context, the workspace client app can include, for example, a Citrix Workspace™ client or Citrix Receiver™ for HTML 5 browsers. In some examples, the workspace client app includes an embedded browser. The embedded browser can be implemented, for example, using the Chromium Embedded Framework.

The workspace client app and a digital workspace service, which can be executed by a server such as server 1522 and/or another server, collectively implement a digital workspace application. This digital workspace application is configured to deliver and manage a user's applications, data, and desktops in a consistent and secure manner, regardless of the user's device or location. The digital workspace application enhances the user experience by streamlining and automating those tasks that a user performs frequently, such as approving expense reports, confirming calendar appointments, submitting helpdesk tickets, and reviewing vacation requests. The workspace application allows users to access functionality provided by multiple enterprise applications—including SaaS applications, web applications, desktop applications, and proprietary applications—through a single interface rendered by the workspace client app. In certain examples, the digital workspace service is configured to control the applications, data, and desktops that users may access via the workspace client app and to help establish connections between the workspace client app and the available applications, data, and desktops.

FIG. 15 further shows types of UI or web data and modifications 1512 that can be queried, processed, and/or augmented by the data augmentation tool 1502 and components that can query, gather, and modify the UI or web data 1512. As shown, the UI or web data 1512 can include one or more of hook messages 1516, UI automation message 1518, and/or HTML 1524. The hook messages 1516 and UI automation messages 1518 can be generated from UI related processes executed by the target application 1514. The HTML 1524 can originate from a server application 1522 and can be served to the target application 1514. In some examples, the HTML 1524 is transmitted to the client computer 1510 from the server 1522 via a gateway process 1526 before the HTML 1524 is received by the target application 1514. In some examples, the HTML 1524 is transmitted to the data augmentation tool 1502 by the target application 1514 after it is received by the target application 1514.

In some examples, the system can communicate UI or web data and modifications 1512 in both directions between the data augmentation tool 1502 and the target application 1514, so that the data augmentation tool 1502 can query, gather, and modify information about the target application 1514. The system can use hook messages 1516 and/or UI automation messages 1518 (e.g., DOM, web, navigation, and/or UI automation event hooks) to communicate to the data augmentation tool 1502 information about user events occurring within target application 1514. Such user events may include, for example, navigation events, such as a user selecting hyperlinks or entering uniform resource locators (URLs), as well as clicks or other UI mouse events within target application 1514. In another example, when the data augmentation tool 1502 is active, interacting with (for example, selecting) any UI element in the target application 1514 may not cause the UI element to perform the corresponding regular action. Instead, UI interactions within the target application 1514 can be intercepted by the data augmentation tool 1502. For example, an event handler can intercept the UI interaction and prevents the corresponding UI action from occurring while the data augmentation tool 1502 is active.

In some examples, the data augmentation tool 1502 is configured to receive and process one or more of the hook messages 1516, the automation messages 1518, and the HTML 1524. In other examples, the data augmentation tool 1502 is configured to process two or more of types of the data 1512. In either case, the data augmentation tool 1502 can be configured to acquire the data 1512 using a variety of techniques. For instance, in some examples, the data augmentation tool 1502 is configured to poll sources (e.g., the target application 1514, the server application 1522, and/or the gateway process 1526) of the data 1512. In other examples, the data augmentation tool 1502 can also register, with the sources of the data 1512, to receive notifications regarding changes to the data 1512.

In some examples, the data augmentation tool 1502 can also send and/or modify the hook messages 1516, automation messages 1518, and/or HTML 1524. For example, the data augmentation tool 1502 can use hook messages 1516 and/or UI automation messages 1518 to modify the attributes of the UI or web elements according to the user's selections. In an example, the data augmentation tool 1502 can also make use of a headless browser 1508 to iterate through modifications to the target application 1514 and/or HTML 1524.

In some examples, the data store 1506 can store user options, attribute values, and/or HTML. For example, the data store 1506 can receive user selections of UI or web elements and/or attributes for augmentation from the data augmentation toolbox 1504 or from the data 1512, and store these user selections. The data store 1506 can also store lists of attribute values and can provide these values to the data augmentation toolbox 1504 and/or the headless browser 1508 to iterate during augmentation. In addition, the data store 1506 can store HTML 1524, which the data augmentation toolbox 1504 can modify during augmentation and provide to the headless browser to generate augmented software objects and images. In addition, the data store 1506 may store augmented software object images.

Computing Device

Figure 16:
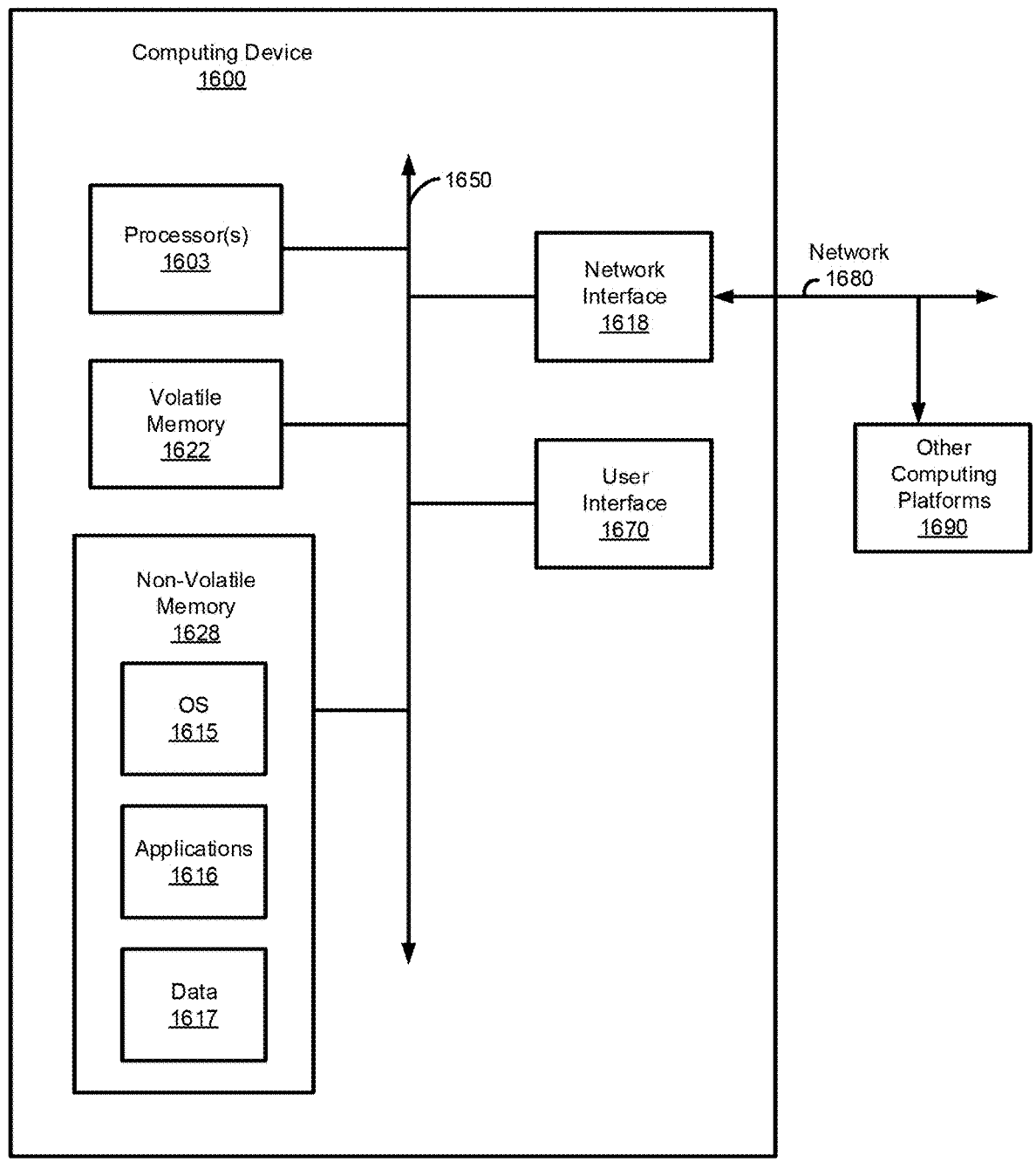
FIG. 16 is a block diagram of a computing device configured to implement various systems and processes in accordance with examples disclosed herein.

FIG. 16 is a block diagram of a computing device 1600 configured to implement various systems and processes in accordance with examples disclosed herein.

The computing device 1600 includes one or more processor(s) 1603, volatile memory 1622 (e.g., random access memory (RAM)), non-volatile memory 1628, a user interface (UI) 1670, one or more network or communication interfaces 1618, and a communications bus 1650. The computing device 1600 may also be referred to as a client device, computing device, endpoint device, computer, or a computer system.

The non-volatile (non-transitory) memory 1628 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1670 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1628 stores an OS 1615, one or more applications or programs 1616, and data 1617. The OS 1615 and the application 1616 include sequences of instructions that are encoded for execution by processor(s) 1603. Execution of these instructions results in manipulated data. Prior to their execution, the instructions can be copied to the volatile memory 1622. In some examples, the volatile memory 1622 can include one or more types of RAM and/or a cache memory that can offer a faster response time than a main memory. Data can be entered through the user interface 1670 or received from the other I/O device(s), such as the network interface 1618. The various elements of the device 1600 described above can communicate with one another via the communications bus 1650.

The illustrated computing device 1600 is shown merely as an example client device or server and can be implemented within any computing or processing environment with any type of physical or virtual machine or set of physical and virtual machines that can have suitable hardware and/or software capable of operating as described herein.

The processor(s) 1603 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1603 can be analog, digital or mixed. In some examples, the processor(s) 1603 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 1618 can include one or more interfaces to enable the computing device 1600 to access a computer network 1680 such as a Local Area Network (LAN), a Wide Area Network (WAN), a Personal Area Network (PAN), or the Internet through a variety of wired and/or wireless connections, including cellular connections and Bluetooth connections. In some examples, the network 1680 may allow for communication with other computing devices 1690, to enable distributed computing. The network 1680 can include, for example, one or more private and/or public networks over which computing devices can exchange data.

In described examples, the computing device 1600 can execute an application on behalf of a user of a client device. For example, the computing device 1600 can execute one or more virtual machines managed by a hypervisor. Each virtual machine can provide an execution session within which applications execute on behalf of a user or a client device, such as a hosted desktop session. The computing device 1600 can also execute a terminal services session to provide a hosted desktop environment. The computing device 1600 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A client computer system configured to augment training, testing, or validation images of software objects, the client computer system comprising:
 a memory; and
 at least one processor coupled to the memory and configured to:
  receive a user selection of a portion of a display view;
  iteratively select, within a first respective iteration, a first respective attribute value from a predetermined set of attribute values;
  iteratively modify an attribute of a software object according to the first respective attribute value, wherein the attribute comprises a foreground position of the software object, and wherein the software object comprises at least one portion of a locally executed application, a web page, a web application, or a software as a service (SaaS) application;
  iteratively generate a respective augmented image of the software object with the attribute modified according to the first respective attribute value of the first respective iteration and based on the user selection of the portion of the display view; and
  train, test, or validate a machine learning (ML) process based on the respective augmented image.

2. The client computer system of claim 1, wherein to iteratively modify the attribute of the software object comprises:
 to receive:
  a user selection of:
   one or more user interface (UI) elements belonging to the software object; and
   the attribute, wherein the attribute characterizes the one or more UI elements; and
  a user specification of the predetermined set of attribute values; and
 to iteratively modify the attribute characterizing the one or more UI elements according to the first respective attribute value.

3. The client computer system of claim 1, wherein to modify the attribute of the software object is based on one or more of:
 a UI automation application programming interface (API);
 hooking;
 a modification of a hypertext markup language (HTML) document associated with the software object;
 a modification of a document object model (DOM) associated with the software object;
 a modification of a cascading style sheet (CSS) attribute associated with the attribute of the software object; or
 a data augmentation toolbox.

4. The client computer system of claim 1, wherein to modify the attribute of the software object comprises to modify an HTML document corresponding to the software object via a headless browser session.

5. The client computer system of claim 1, wherein the attribute of the software object further comprises one or more of:
 a window size or aspect ratio;
 text contents;
 a text size or color;
 a font style;
 a theme;
 an icon;
 a window title size or color; or
 a button appearance or button text.

6. The client computer system of claim 1, wherein the attribute is a first attribute and the at least one processor is further configured to:
 iteratively select a second respective attribute value from a second predetermined set of attribute values; and
 iteratively modify a second attribute of the software object according to the second respective attribute value; and
 wherein to iteratively generate the respective augmented image comprises to iteratively generate the respective augmented image with the first attribute modified according to the first respective attribute value and the second attribute modified according to the second respective attribute value.

7. The client computer system of claim 1, wherein the software object comprises one or more of: an executable application, a window, a dialog box, another UI element, a web page, a web app, or a software as a service (SaaS) app.

8. The client computer system of claim 1, wherein
 to iteratively modify the attribute of the software object comprises to overlay the software object at the foreground position over a background object, while a position of the background object remains unmodified.

9. A method of augmenting training, testing, or validation images of software objects, the method comprising:
 receiving a user selection of a portion of a display view;
 iteratively selecting, by a processing device and within a first respective iteration, a first respective attribute value from a predetermined set of attribute values;
 iteratively modifying an attribute of a software object according to the first respective attribute value, wherein the attribute comprises a foreground position of the software object, and wherein the software object comprises at least one portion of a locally executed application, a web page, a web application, or a software as a service (SaaS) application;
 iteratively generating a respective augmented image of the software object with the attribute modified according to the first respective attribute value of the first respective iteration and based on the user selection of the portion of the display view;
 iteratively storing the respective augmented image within a training, testing, or validation dataset in a non-transitory storage; and
 training, testing, or validating a machine learning (ML) process based on the training, testing, or validation dataset.

10. The method of claim 9, wherein iteratively modifying the attribute of the software object comprises:
 receiving:
  a user selection of:
   one or more user interface (UI) elements belonging to the software object; and
   the attribute, wherein the attribute characterizes the one or more UI elements; and
  a user specification of the predetermined set of attribute values; and
 iteratively modifying the attribute characterizing the one or more UI elements according to the first respective attribute value.

11. The method of claim 9, wherein modifying the attribute of the software object is based on one or more of:
 a UI automation application programming interface (API);
 hooking;
 modifying a hypertext markup language (HTML) document associated with the software object;

modifying a document object model (DOM) associated with the software object;
modifying a cascading style sheet (CSS) attribute associated with the software object; or a data augmentation toolbox.

12. The method of claim 9, wherein the attribute of the software object further comprises one or more of:
a window size or aspect ratio;
text contents;
a text size or color;
a font style;
a theme;
an icon;
a window title size or color; or
a button appearance or button text.

13. The method of claim 9, wherein the attribute is a first attribute, and further comprising:
iteratively selecting a second respective attribute value from a second predetermined set of attribute values; and
iteratively modifying a second attribute of the software object according to the second respective attribute value; and
wherein iteratively generating the respective augmented image comprises iteratively generating the respective augmented image with the first attribute modified according to the first respective attribute value and the second attribute modified according to the second respective attribute value.

14. The method of claim 9, further comprising: wherein:
training the ML process comprises training the ML process based on the generated augmented image to obtain trained parameter values;
testing the ML process comprises testing the ML process based on the generated augmented image to obtain an evaluated model; or
validating the ML process comprises validating the ML process based on the generated augmented image to obtain tuned hyperparameter values.

15. A non-transitory computer readable medium storing executable sequences of instructions to augment training, testing, or validation images of software objects, the sequences of instructions comprising instructions to:
receive a user selection of a portion of a display view;
iteratively select, within a first respective iteration, a first respective attribute value from a predetermined set of attribute values;
iteratively modify an attribute of a software object according to the first respective attribute value, wherein the attribute comprises a foreground position of the software object, and wherein the software object comprises at least one portion of a locally executed application, a web page, a web application, or a software as a service (SaaS) application;
iteratively generate a respective augmented image of the software object with the attribute modified according to the first respective attribute value of the first respective iteration and based on the user selection of the portion of the display view; and
train, test, or validate a machine learning (ML) process based on the respective augmented image.

16. The non-transitory computer readable medium of claim 15, wherein to iteratively modify the attribute of the software object comprises:
to receive:
a user selection of:
one or more user interface (UI) elements belonging to the software object; and
the attribute, wherein the attribute characterizes the one or more UI elements; and
a user specification of the predetermined set of attribute values; and
to iteratively modify the attribute characterizing the one or more UI elements according to the first respective attribute value.

17. The non-transitory computer readable medium of claim 15, wherein to modify the attribute of the software object is based on one or more of:
a UI automation application programming interface (API);
hooking;
a modification of a hypertext markup language (HTML) document associated with the software object;
a modification of a document object model (DOM) associated with the software object;
a modification of a cascading style sheet (CSS) attribute associated with the software object; or a data augmentation toolbox.

18. The non-transitory computer readable medium of claim 15, wherein the attribute is a first attribute, and the sequences of instructions further comprise instructions to:
iteratively select a second respective attribute value from a second predetermined set of attribute values; and
iteratively modify a second attribute of the software object according to the second respective attribute value; and
wherein to iteratively generate the respective augmented image comprises to iteratively generate the respective augmented image with the first attribute modified according to the first respective attribute value and the second attribute modified according to the second respective attribute value.

19. The client computer system of claim 1, wherein the processor is further configured to:
iteratively select, in a second respective iteration, a second respective attribute value from the predetermined set of attribute values;
iteratively modify the attribute according to the second respective attribute value; and
iteratively generate a second respective augmented image of the software object with the attribute modified according to the second respective attribute value of the second respective iteration.

* * * * *